(12) United States Patent
Ajitomi et al.

(10) Patent No.: US 8,776,203 B2
(45) Date of Patent: Jul. 8, 2014

(54) ACCESS AUTHORIZING APPARATUS

(75) Inventors: Daisuke Ajitomi, Yokohama (JP);
Keisuke Minami, Tokyo (JP); Shunichi Gondo, Tokyo (JP); Hiroyuki Aizu, Yokohama (JP); Kotaro Ise, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 54 days.

(21) Appl. No.: 13/233,566

(22) Filed: Sep. 15, 2011

(65) Prior Publication Data
US 2012/0110646 A1 May 3, 2012

(30) Foreign Application Priority Data

Oct. 29, 2010 (JP) ................................. 2010-244678

(51) Int. Cl.
*G06F 7/04* (2006.01)
(52) U.S. Cl.
USPC .................................................. 726/9; 726/2
(58) Field of Classification Search
USPC ...................................... 726/2, 3, 4, 5, 9, 10
See application file for complete search history.

(56) References Cited

U.S. PATENT DOCUMENTS 6,574,609 B1 * 6/2003 Downs et al. .................... 705/50
7,912,921 B2 * 3/2011 O'Rourke et al. ............. 709/219
2008/0086767 A1 * 4/2008 Kulkarni et al. .................. 726/9

OTHER PUBLICATIONS

E. Hammer-Lahav, Ed., "The OAuth 2.0 Authorization Protocol" draft-letf-oauth-v2-22, 2011.

* cited by examiner

*Primary Examiner* — Ellen Tran
(74) *Attorney, Agent, or Firm* — Nixon & Vanderhye, P.C.

(57) ABSTRACT

An access authorizing apparatus includes a receiving unit, a first transmitting/receiving unit, a token issuer and a transmitting unit. A receiving unit receives first approval information indicating that access to the resource in the device has been approved by an access approver, from the first application via the network. A first transmitting/receiving unit transmits an access approval request including the first approval information to the access approving apparatus, and receives access enable/disable information indicating whether the access to the resource by the first application is permitted, from the access approving apparatus. A token issuer, when the access enable/disable information indicates that the access to the resource is permitted, issues token information that gives authority to access the resource to the first application. A transmitting unit transmits the token information issued by the token issuer, to the first application.

37 Claims, 15 Drawing Sheets

| COMPONENTS | MUST (M)/ OPTION (O) | ACTUAL DATA EXAMPLE |
|---|---|---|
| ACCESS ENABLE/DISABLE VERIFICATION CODE | M | 0x0011223344556677 // UNIQUE BYTE EXAMPLE |
| CONFIDENTIAL INFORMATION | O | 0x7788990011223344 // BYTE EXAMPLE |
| RESOURCE CLASS | O | digitalTV // ex) DEVICE CLASS |
| RESOURCE ATTRIBUTE | O | modelName.XYZ // ex) MODEL NAME |
| RESOURCE RANGE | O | recordProgram.getRecordedList() // ACQUIRE RECORDED PROGRAM LIST<br>recordProgram.reserve() // RESERVE<br>recordProgram.cancel() // CANCEL |

FIG. 3

| COMPONENTS | MUST (M)/ OPTION (O) | ACTUAL DATA EXAMPLE |
|---|---|---|
| TOKEN | M | 0xAABBCCDDEEFF0011 |
| USER INFORMATION | M | |
| USER IDENTIFICATION INFORMATION | M | 0x12345678 |
| APPLICATION NAME | O | Recorded Program Navi |
| DATE AND TIME OF DEVELOPMENT | O | 2010-01-01 01:01:01 |
| VERSION | O | Version 1.1.1 |
| DEVELOPER INFORMATION | O | |
| DEVELOPER ID | O | Sample.Developer01 |
| DEVELOPER NAME | O | Taro Yamada |
| CONTACT INFORMATION | O | developer@example.com |
| DEVICE INFORMATION | M | uuid:006b8820-cf14-11df-bd3b-0800200c9a66 |
| DEVICE IDENTIFICATION INFORMATION | M | |
| PRODUCT NAME | O | Digital TV: Sample |
| MODEL NUMBER | O | Sample.XYZ |
| APPROVAL INFORMATION | O | SEE FIG.3 |
| SEE FIG.3 | – | |
| VALID FLAG | O | True |
| TEAM OF VALIDITY | M | 2010-10-10 10:10:10 |

FIG. 4

ACCESS AUTHORIZING APPARATUS

CROSS REFERENCE TO RELATED APPLICATIONS

This application is based upon and claims the benefit of priority from the prior Japanese Patent Application No. 2010-244678, filed on Oct. 29, 2010, the entire contents of which are incorporated herein by reference.

FIELD

Embodiments of the present invention relate to an access authorizing apparatus.

BACKGROUND

When one service on the Internet causes a third party (such as a third party application) other than the service and a user to use information and functions (hereinafter, referred to as "resources") related to various services, including personal information on the user of the service, there is Non Patent Literature 1 as a technique for transferring only access authority, without publishing authentication information (such as a user ID (approver ID) and a password) for accessing the resources, to the service.

Non Patent Literature 1 (E. Hammer-Lahav, Ed., D. Recordon, D. Hardt "The OAuth 2.0 Protocol", Network Working Group, IETF, Jun. 15, 2010) has a merit that there is no need to publish the authentication information to the service when the authority to access the resources is transferred, and in addition, has a merit that not only the user but also a manager of the service can prevent unauthorized access to the resources by the third party.

Non Patent Literature 1 assumes that a trust relationship (contractual relationship) has been able to be directly constructed in advance, mainly between a resource managing entity (the above described service on the Internet) and the third party. Consequently, if the service cannot directly construct the relationship because the number of resource managing entities is enormous and the resource managing entities are ubiquitous, or the like (for example, if household electrical appliances are assumed as the resource managing entities, or the like), Non Patent Literature 1 cannot be used. Accordingly, a manager of the resource managing entity other than the user cannot prevent the unauthorized access to the resources by the third party.

As described above, a conventional art has a problem that, in a case where the third party cannot directly construct the trust relationship with the resource managing entities because the number of the resource managing entities is enormous and the resource managing entities are ubiquitous, or the like, the authority to access the resources cannot be transferred to the third party. Furthermore, there is a problem that the manager of the resource managing entity other than the user cannot prevent the unauthorized access to the resources by the third party.

BRIEF DESCRIPTION OF THE DRAWINGS

FIG. 3 is a diagram showing an example of a data structure of approval information;

FIG. 4 is a diagram showing an example of a data structure of token information;

DETAILED DESCRIPTION

According to an aspect of the embodiments, there is provided an access authorizing apparatus that is connected to a device having a resource used by a first application, and an access approving apparatus, respectively via a network, the access authorizing apparatus.

The access authorizing apparatus includes a receiving unit, a first transmitting/receiving unit, a token issuer and a transmitting unit.

The receiving unit receives first approval information indicating that access to the resource in the device has been approved by an access approver, from the first application via the network.

The first transmitting/receiving unit transmits an access approval request including the first approval information to the access approving apparatus, and receives access enable/disable information indicating whether the access to the resource by the first application is permitted, from the access approving apparatus.

The token issuer, when the access enable/disable information indicates that the access to the resource is permitted, issues token information that gives authority to access the resource to the first application.

The transmitting unit transmits the token information issued by the token issuer, to the first application.

In the following, embodiments of the present invention will be described in detail by reference to the drawings.

First Embodiment

Figure 1:
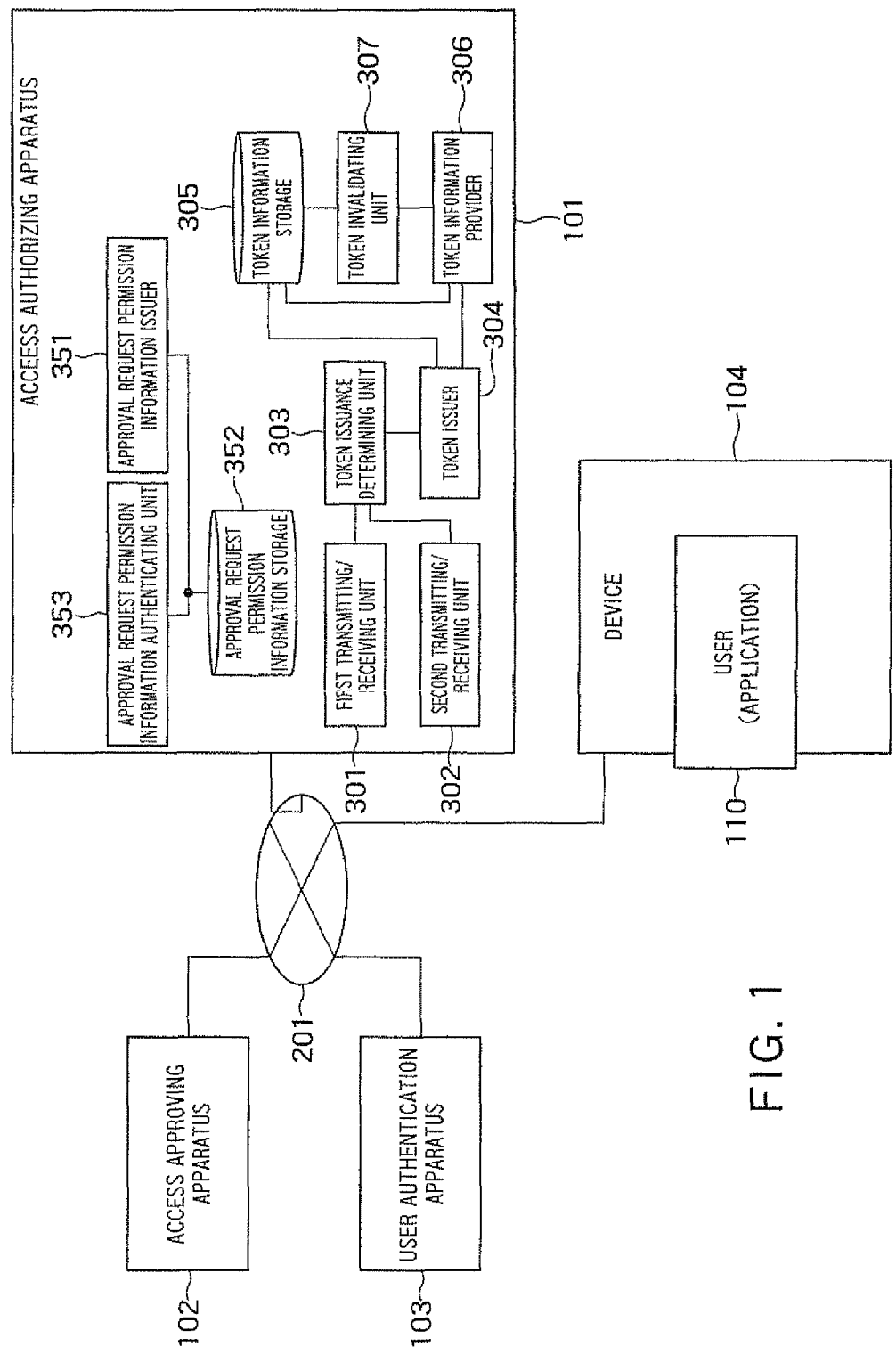
FIG. 1 is a block diagram showing a configuration of a system according to a first embodiment of the present invention.

FIG. 1 is a system configuration diagram showing functional blocks of an access authorizing apparatus according to a first embodiment of the present invention. A system according to the first embodiment is configured with an access authorizing apparatus 101, an access approving apparatus 102, a user authenticating apparatus 103, a device 104 and an application (first application) 110. The access authorizing apparatus 101, the access approving apparatus 102, the user authenticating apparatus 103, and the device 104 are connected via a network 201.

Next, a hardware configuration of the access authorizing apparatus 101 according to the present embodiment will be described. The access authorizing apparatus 101 of the present embodiment includes a controlling unit such as a CPU (Central Processing Unit) that controls the entire apparatus, a main storage such as a ROM (Read Only Memory) or a RAM (Random Access Memory) that stores various data and various programs, an auxiliary storage such as an HDD (Hard Disk Drive) that stores various data such as GUI information and various programs, and a bus that connects these units. This hardware configuration uses an ordinary computer. Moreover, in the access authorizing apparatus 101, a wireless or wired communication I/F (interface) that controls communication with external apparatuses (102 to 104) is provided. The communication with each external apparatus is performed via the network 201. The access authorizing apparatus 101 has at least a unit that transmits and receives information to and from the access approving apparatus 102, the user authenticating apparatus 103, the device 104, and the application (user) installed on the device 104, via the network 201. The access authorizing apparatus 101 is realized, for example, as a server apparatus existing on the Internet. In the present embodiment, the access authorizing apparatus 101 is assumed to be the server apparatus on the Internet.

It should be noted that hardware configurations of the access approving apparatus 102 and the user authenticating apparatus 103 are similar to the access authorizing apparatus 101. In the present embodiment, similarly to the access authorizing apparatus 101, they are assumed to be server apparatuses existing on the Internet.

Next, a hardware configuration of the device 104 will be described. Similarly to the access authorizing apparatus 101, the device 104 of the present embodiment has the hardware configuration using an ordinary computer. A difference from the access authorizing apparatus 101 is that a GUI displaying unit such as a liquid crystal display, and an operation inputting unit, such as a keyboard, a mouse or a remote controller, which accepts an instruction input from the user, are provided in order for the user to approve access to an internal resource in the device by the application 110. Similarly to the access authorizing apparatus 101, a communication I/F is provided, and a unit that transmits and receives the information to and from the access authorizing apparatus 101 via the network 201 is included. The device 104 is realized, for example, as a personal computer, a digital television, a hard disk recorder, or a mobile device such as a slate pc or a smart phone. In the present embodiment, the device 104 is assumed to be the digital television. Furthermore, the resource provided to the application 110 by this device 104 is assumed to be a recorded program list for digital terrestrial broadcasting that is accumulated in a hard disk included in the television.

The network 201 is, for example, the Internet, an NGN (Next Generation Network) that is a quality-assured, closed network, or the like. In the present embodiment, the network 201 is assumed to be the Internet.

The application 110 is software downloaded from a server or a recording medium such as a CD-ROM (not shown), onto the device 104. This may be a native application that is distributed and installed in a binary format that can be directly executed by hardware (a processor) of the device 104, or may be a non-native application that is described in a program language executed on a VM (Virtual Machine) and is executed by the processor on the device 104 via the VM, like Java (R). The latter application further may be a Web application that is described in HTML (HyperText Markup Language), CSS (Cascading Style Sheet) or JavaScript and is equivalent to a so-called Web page. In a case of the Web application, the Web application may be arranged on a local HTTP (HyperText Transfer Protocol) server within the device 104, may be placed on a premise LAN as a private server arranged in a premise network, or may be arranged on an external server that realizes a service on the Internet. In the present embodiment, it is assumed to be the Web application arranged on the local HTTP server. In other words, the application 110 is assumed to be Web content that operates on a Web browser installed on the device 104 (digital television) (or on middleware that realizes a Web browser, such as Webkit).

Next, in the above described hardware configurations, various functions realized by the CPU of the access authorizing apparatus 101 executing the various programs stored in the main storage and the auxiliary storage will be described according to FIG. 1. The access authorizing apparatus 101 has a first transmitting/receiving unit 301, a second transmitting/receiving unit 302, a token issuance determining unit 303, a token issuer 304, a token information storage 305, a token information provider 306, a token invalidating unit 307, an approval request permission information issuer 351, an approval request permission information storage 352, and an approval request permission information authenticating unit 353.

Among them, the first transmitting/receiving unit 301, the second transmitting/receiving unit 302, the token issuance determining unit 303, the token issuer 304, the token information provider 306, the token invalidating unit 307, the approval request permission information issuer 351, and the approval request permission information authenticating unit 353 are realized by executing a code expanded on the main storage such as the RAM when the CPU executes the program.

Moreover, the token information storage 305 and the approval request permission information storage 352 are, for example, database management systems constructed in the main storing or auxiliary storage. This may be a relational database, or may be an XML (eXtensible Markup Language) database. Moreover, this does not need to be constructed with a single database management system, and a plurality of database management systems, for example, SQLite3, Oracle, MySQL and the like may also be used together. Moreover, this may be constructed on a single physical storage, or may be a database management system configured with a plurality of physical auxiliary storages such as an NAS (Network Attached Storage) and an SAN (Storage Area Network). Moreover, a data storage area may be nonvolatile or may be volatile. Alternatively, if a unit that can acquire unit information (entry) on each data to be stored in each storage is provided, this may be a simple data managing module based on a list structure that is generated on the main storage when the CPU executes the program, may be a CSV format file managing module, or may be configured with a Key/Value store.

Subsequently, each unit included in the present embodiment will be described in detail below.

The first transmitting/receiving unit 301 performs data communication with the access approving apparatus 102. The first transmitting/receiving unit 301 transmits user identification information that identifies the application 110, device identification information that identifies the device 104, and approval information (first approval information) indicating that the application 110 has been approved by a corresponding access approver for the access to the resource in the device 104, to the access approving apparatus 102, and receives access enable/disable information representing whether the access to the resource in the device 104 by the application 110 is enabled or disabled. This transmitting/receiving process is performed on the network 201, and for example, is realized by HTTP (Hypertext Transfer Protocol) communication. At this time, generally, the first transmitting/receiving unit 301 becomes an HTTP client, and the access approving apparatus 102 becomes an HTTP server. However, as a form of realization, they are not limited thereto. A configuration is also conceivable in which communication connection from the access approving apparatus 102 to the first transmitting/receiving unit 301 is established. In this case, conversely, the first transmitting/receiving unit 301 behaves as the HTTP server. This communication via the network 201 is not limited to HTTP. As long as the above described data can be transmitted and received, another existing communication protocol may be used, or a proprietary communication protocol may be designed and used. This assumption applies to all the communication via the network 201 according to the present invention. Hereinafter, each piece of the information transmitted and received by the first transmitting/receiving unit 301 will be explained.

First, the user identification information is information issued to the application (user) 110 by the user authenticating apparatus 103. The user identification information uniquely identifies the application 110. A developer of the application 110 receives the issuance of the user identification information from the user authenticating apparatus 103 before publishing/distributing the application 110, and sets the user identification information within the application 110. This issuance may be performed, for example, by preparing a Web page for registering the application, by the user authenticating apparatus 103, and inputting necessary information into a registration format on this Web page and applying for the issuance by the above described developer. Alternatively, the issuance of the user identification information may be requested based on an e-mail. As long as the setting within the application is performed before the application 110 is published/distributed, any issuance form may be used. The user identification information includes a user ID that can uniquely identify the user in the user authenticating apparatus 103, and can further include confidential information for authenticating validity of the user ID.

The device identification information is information that can uniquely identify the device 104. Specifically, a combination of an MAC (Media Access Control) address, a UUID (Universal Unique Identifier), a product model name and a manufacturing number, or the like is conceivable. A format of the device identification information may be any format as long as the device can be uniquely identified in the access authorizing apparatus 101 or the access approving apparatus 102.

The approval information (first approval information) is information that is issued to the application 110 by the access approving apparatus 102, and is information indicating that the application 110 has been approved by the access approver (for example, an owner of the device 104, a device manufacturer that has developed the device 104, or the like) for the access to the resource in the device 104. The approval information includes at least an access enable/disable verification code indicating that the approval has been obtained, and can further include confidential information for proving validity of this access enable/disable verification code, and class information, attribute information, or range information on the resource in the approved device 104. A specific configuration example of the approval information is shown in FIG. 3.

The access enable/disable information returned by the access approving apparatus 102 is a logical value representing whether or not the above described approval information is correct, that is, whether or not the access has been approved.

The second transmitting/receiving unit 302 performs data communication with the user authenticating apparatus 103. The second transmitting/receiving unit 302 transmits the user identification information to the user authenticating apparatus 103, and receives user authentication result information. This user authentication result information includes at least a logical value representing whether or not user authentication (that is, authentication of whether or not the application related to the user identification information is valid (has been previously registered)) executed in the user authenticating apparatus 103 has succeeded. The second transmitting/receiving unit 302 communicates with the user authenticating apparatus 103 via the network 201. This communication is assumed to be realized, generally, by HTTP communication, which, however, is not limited thereto as described in a description of the first transmitting/receiving unit 301.

The token issuance determining unit 303 determines whether token issuance is enabled or disabled, based on the access enable/disable information received from the access approving apparatus 102 by the first transmitting/receiving unit 301, and the user authentication result information received from the user authenticating apparatus 103 by the second transmitting/receiving unit 302. If the access enable/disable information indicates "enabled" and the user authentication result information indicates "success", the token issuance is permitted. Otherwise, the token issuance is not permitted.

The token issuer 304 acquires the user identification information, the device identification information and the approval information from the application 110. The token issuer 304 receives these pieces of information from the application by a receiving unit (not shown). The token issuer 304 passes these pieces of the acquired information to the above described token issuance determining unit 303, and requests to determine whether the token issuance is enabled or disabled. When acquiring a determination result indicating that the issuance is "enabled", from the token issuance determining unit 303, the token issuer 304 generates token information including a token, and transmits the token information to the application 110 from a transmitting unit (not shown). Conversely, if a determination result indicating that the issuance is "disabled" is acquired, a token issuance error message is generated, and the token issuance error message is transmitted to the application 110 from the transmitting unit (not shown). The generated token information is registered in the token information storage 305 to be described later. Communication related to this token issuance, between the application 110 (the device 104 in which the application 110 operates) and the token issuer 304, is also performed via the network 201. Generally, it is assumed to be realized by the HTTP communication, which, however, is not limited thereto as described in the description of the first transmitting/receiving unit 301. Similarly to the token issuer and the like, the above described receiving unit and transmitting unit (not shown) may be realized by executing the code expanded on the main storage such as the RAM when the CPU executes the program.

Here, the token is an identifier of the token information, and for example, can be realized as a fixed length bit sequence. The token may be in any format as long as "access to a particular resource by a particular application" can be specified in the access authorizing apparatus 101.

The token information includes at least the token, and can further include the user identification information, the device identification information, the approval information, user information that is information related to the application 110, device information that is information related to the device 104, information on a term of validity of the token, and logical value information indicating whether or not the token is valid. Here, the user information includes various kinds of information on the application (such as an application name, application summary information, date and time of development, a version, and a pointer to developer information), and the developer information (such as a developer name, a developing company name, and contact information), which are registered into the user authenticating apparatus 103 by the developer of the application 110 when the above described user identification information is issued. Moreover, the device information can include a product name, a model number, a manufacturing number, resource information to be published, and the like of the device. A specific configuration example of the token information is shown in FIG. 4.

The token information storage 305 stores the token information generated by the token issuer 304.

The token information provider 306 acquires a token acquisition request from the device 104, and provides corresponding token information from the token information storage 305 to the device 104. The token acquisition request may be a request for the token information for a particular token, may be a request for entire token information for a particular device, or may be a request for entire token information for a particular application. Alternatively, it may be a request for all valid token information accumulated in the token information storage 305, or conversely, it may be a request for all invalid token information. It should be noted that communication related to the token acquisition request is also performed via the network 201. Generally, it is assumed to be realized by the HTTP communication. In this case, the token information provider 306 functions as the HTTP server. A communication protocol to be used is not limited to HTTP. The communication protocol is not limited thereto as described in the description of the first transmitting/receiving unit 301. Furthermore, if the token has been invalidated or content thereof has been updated, the token information provider 306 may notify a corresponding device of this change. In this case, the token information provider 306 may previously establish and maintain a communication channel to the device, and simultaneously with occurrence of the change, may use this communication channel to notify content thereof. This may be realized by using HTTP long polling such as Comet, or may be realized by using the HTTP communication to use WebSocket that constructs a TCP (Transmission Control Protocol) session for two-way communication. In addition, any technique may be used in a framework that realizes a Push-type asynchronous notification from the server side.

The token invalidating unit 307 acquires an invalidation request for an issued token, and as invalidation of this token, deletes the token information including a corresponding token in the token information storage 305, or sets the above described logical value information representing "valid" or "invalid" that is included in the token information, to be "invalid". Furthermore, in order to notify the corresponding device of the invalidation of the token simultaneously with occurrence thereof, the token information is passed to the token information provider 306, and the notification of the invalidation is requested. It should be noted that the invalidation request may be realized by the communication via the network 201, or may be realized offline. For example, when the user of the device calls a call center and reports an unauthorized application, it can also be regarded as the invalidation request. Alternatively, it may be a mail-based report. The invalidation of the token may be realized by operating a database system that is an entity of the token information storage 305, by an operator of the access authorizing apparatus 101 in response to such an invalidation request.

The approval request permission information issuer 351 issues approval request permission information required for acquiring the approval information, based on the user authentication result information. This approval request permission information includes an approval request permission ID that can be uniquely identified in the approval request permission information storage 352 to be described later, and can further include confidential information for authenticating validity of this ID.

The approval request permission information storage 352 stores the approval request permission information issued by the approval request permission information issuer 351. This approval request permission information storage 352 may be realized in a form integrated with the token information storage 305, as a form of realization.

In response to an authentication request for the approval request permission information from the access approving apparatus 102, the approval request permission information authenticating unit 353 performs the authentication based on the information stored in the approval request permission information storage 352, and returns authentication information. For example, the approval request permission ID, a hash value of confidential information, and information on a used hash function are passed to the approval request permission information authenticating unit 353 from the access approving apparatus 102. The approval request permission information authenticating unit 353 obtains a hash value of confidential information accumulated in the approval request permission information storage 352, based on the passed information on the hash function, and determines whether or not there is a match. Alternatively, instead of the hash values, a message and a signature attached by using this confidential information may be used to perform the authentication.

Next, operations of the access authorizing apparatus 101 according to the present embodiment will be described using FIGS. 3, 4, 7, 8, 9 and 10. FIG. 3 shows the approval information issued by the access approving apparatus 102 in the present embodiment. FIG. 4 shows the token information acquired for accessing the resource in the device 104 by the application 110, which is stored by the token information storage 305 in the present embodiment.

Figure 7:
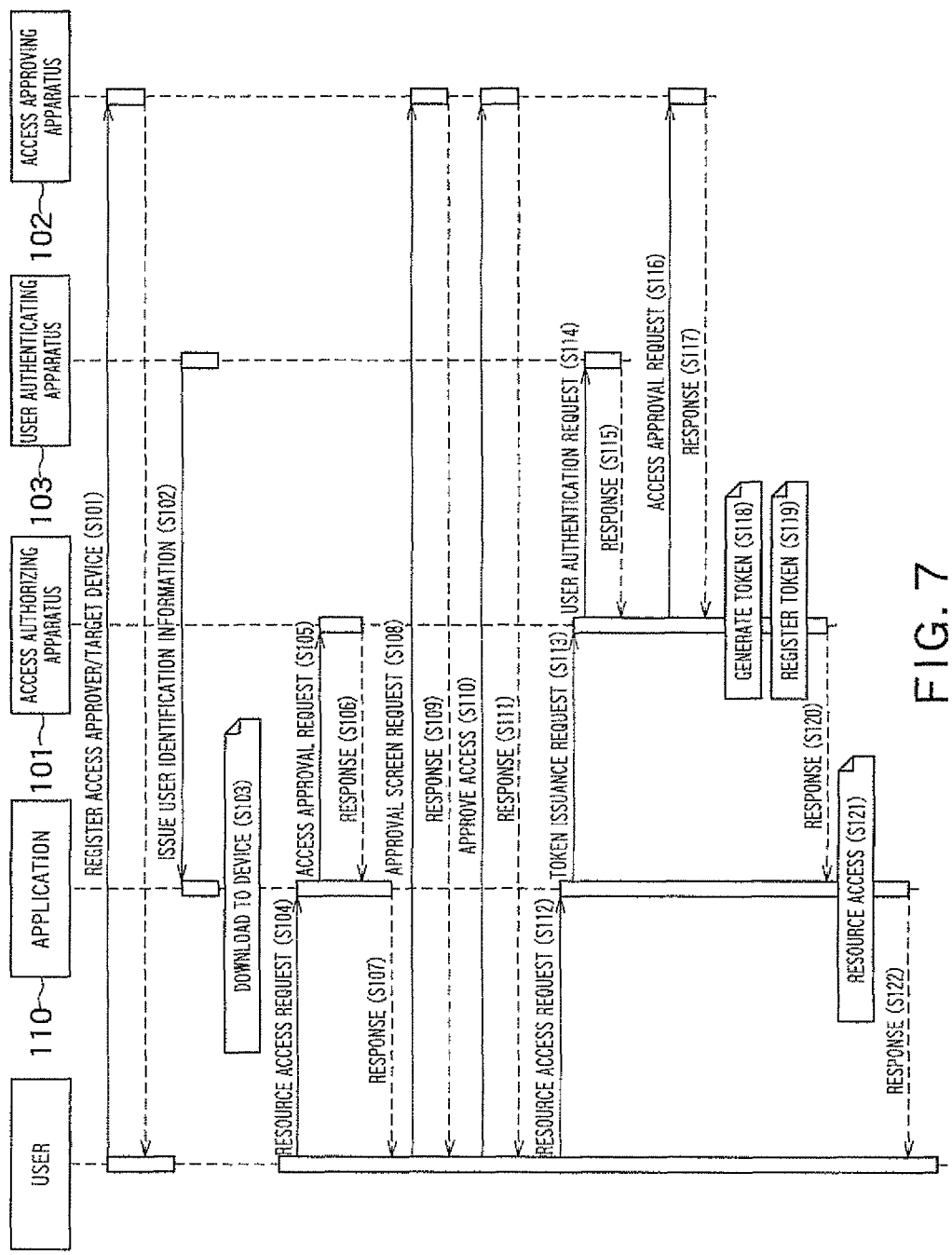
FIG. 7 is a communication sequence diagram (1) related to a token issuing process in the first embodiment of the present invention.
Figure 8:
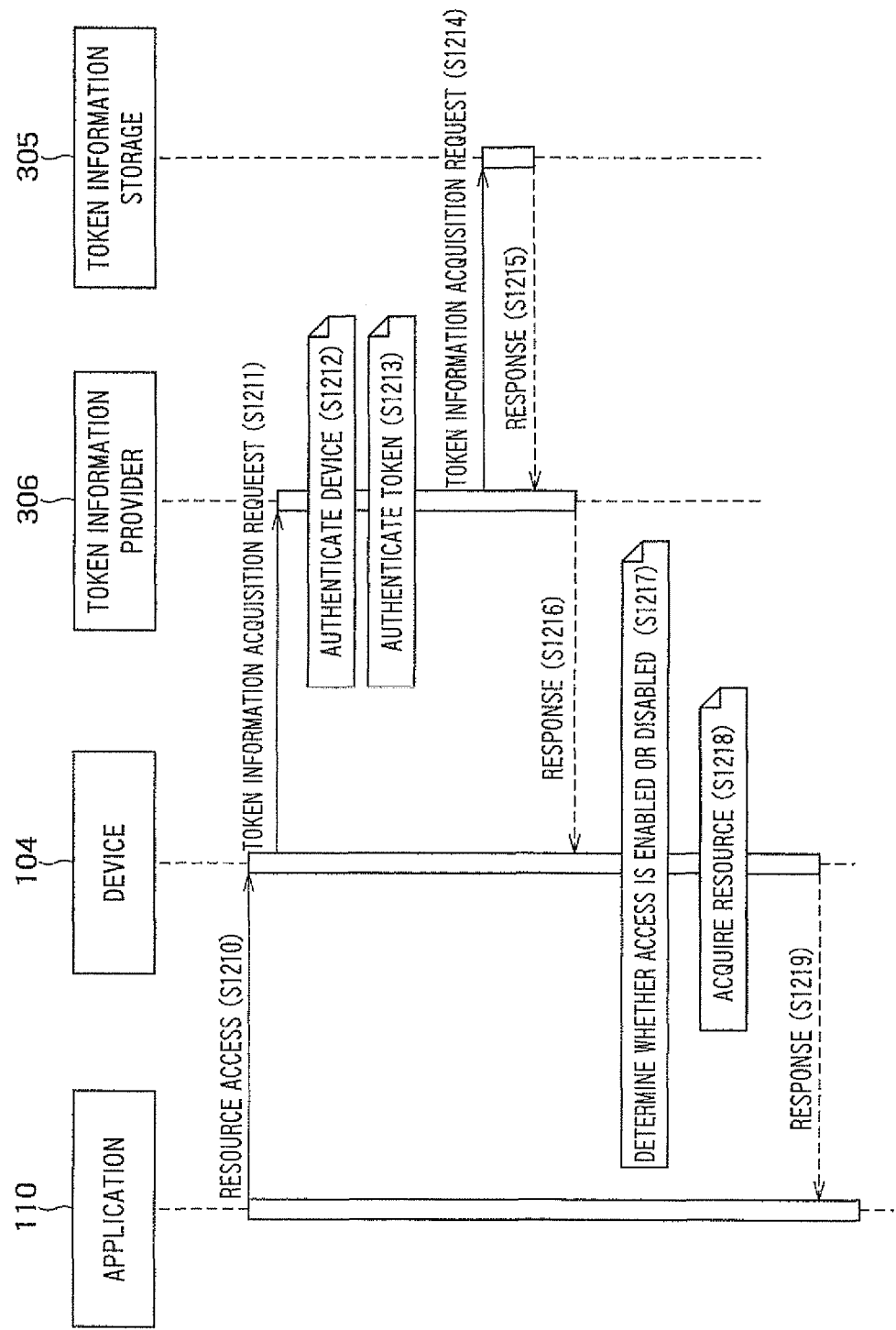
FIG. 8 is a communication sequence diagram related to access control in the first embodiment of the present invention.
Figure 9:
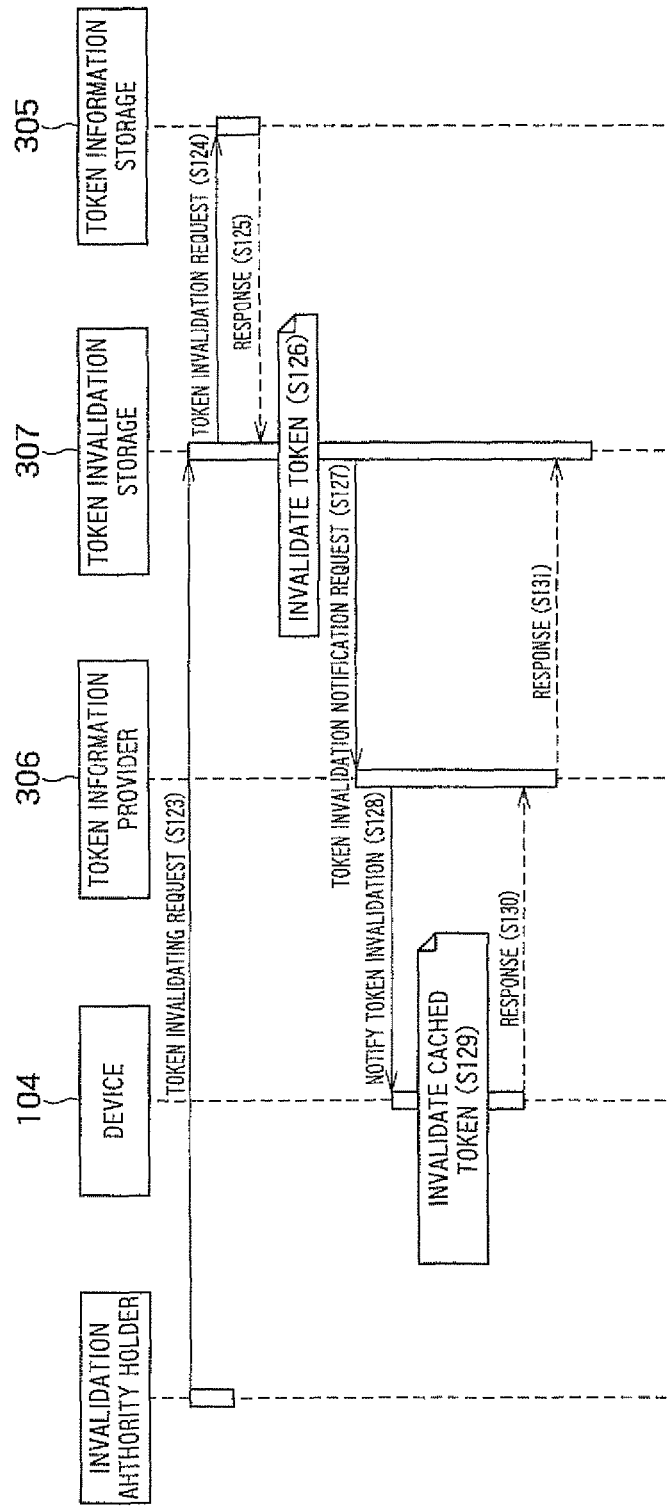
FIG. 9 is a communication sequence diagram related to token invalidation in the first embodiment of the present invention.
Figure 10:
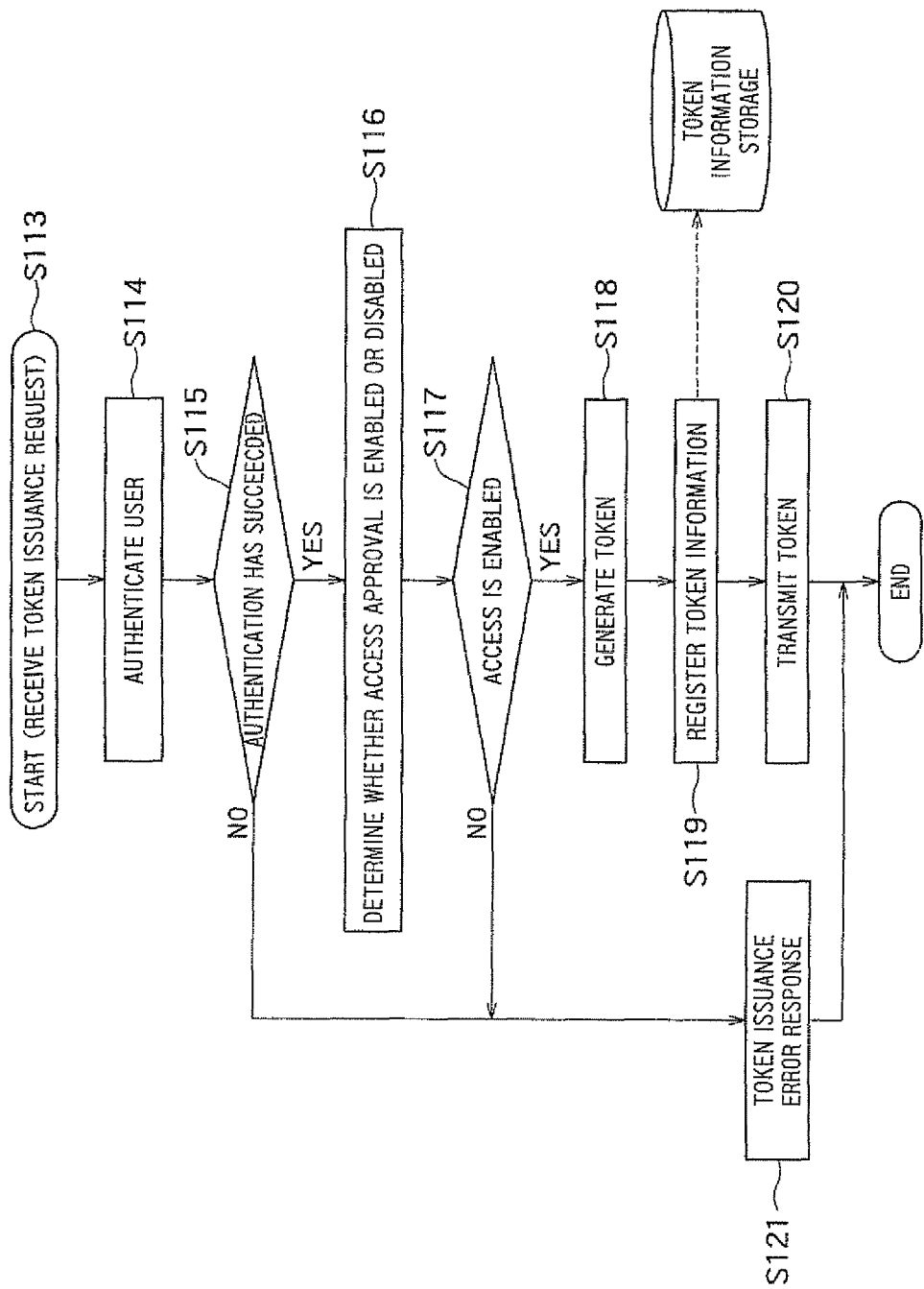
FIG. 10 is a flowchart showing operations in the token issuing process in the first embodiment of the present invention.

FIG. 7 shows a basic sequence of a token issuing process according to the present embodiment. Moreover, FIG. 8 shows a basic sequence of an access controlling process according to the present embodiment. FIG. 9 shows a basic sequence of a token invalidating process according to the present embodiment. FIG. 10 is a flowchart showing the token issuing process in the access authorizing apparatus 101.

It should be noted that, in the present embodiment, the device 104 is the digital television, and the resource that is an access target is recorded program information accumulated in the television. Moreover, the application 110 is a recording navigation application that uses this recorded program information to browse and operate a recording list.

Hereinafter, first, a process procedure from the issuance of the user identification information and the token issuance, to the resource access based on the issued token will be described based on a sequence diagram of FIG. 7.

First, as a premise, the user registers the user himself as the access approver for the device 104 (the digital television), into the access approving apparatus 102 (step S101). It is conceivable to perform this step in a stepwise manner by registering the user as the access approver (in this case, also registering the user ID, a password and the like), and subsequently registering the information on the user's own device as appropriate, or the like. Specifically, it may be realized by preparing a Web page for performing the registration of the access approver and the registration of the device owned by the access approver, by the access approving apparatus 102. Alternatively, each registration may be realized by presetting a URI (Uniform Resource Identifier) of the access approving apparatus 102 into the device 104 so that when the device 104 is connected to the network 201, this device information is automatically registered and the device and the user (the access approver) are bound to each other by using a PIN code, a two-dimensional barcode or the like. In either case, in the present embodiment, since the access approving apparatus 102 is the external apparatus, this embodiment is not questioned.

Next, the user authenticating apparatus 103 issues the user identification information to the application 110 (the recording navigation application) (step S102). For this step, as described above, a form of realization is conceivable in which the developer of the application 110 has performed presetting within the application before a recording application is published/distributed. However, also in this step, since the user authenticating apparatus 103 is the external apparatus, the embodiment is not questioned. Subsequently, the application 110 is published/distributed and downloaded onto the device 104 (step S103).

Here, the user performs an application operation involving the resource access (step S104). In the present embodiment, since the application 110 is the recording navigation application, the access to the resource (the recorded program list) can occur in a startup phase. When the resource access occurs (specifically, when a recorded program list acquiring API (Application Programming Interface) published to the application by the device 104 is called), the application 110 transmits an access approval request to the access authorizing apparatus 101 (step S105). At this time, since redirection to the access approving apparatus 102 is performed in steps S108 and S109 in a latter part, in order to display a screen of the application 110 again, a callback URI is designated for this access approval request. Furthermore, as information required for the access approval, the user identification information and the device identification information are included as parameters. It should be noted that, in the present embodiment, this step is realized by an HTTP GET request.

Subsequently, the access authorizing apparatus 101 receives the access approval request, and redirects the request to the access approving apparatus 102 (steps S106 and S107). In the present embodiment, it is realized by designating a URI of an approval screen of the access approving apparatus 102, in a Refer header in an HTTP GET response. At this time, the user identification information, the device identification information and the callback URI, which have been designated in step S105, are included as query parameters into a URL of a redirection destination.

Here, according to the redirection, an object operated by the user is switched from the application 110 on the device 104 to Web page access through the Web browser that is also on the device 104. The Web browser requests an access approval screen, with the user identification information, the device identification information and the callback URI, according to the Refer header (step S108). The user ID, the password and the like may be included in this request.

The access approving apparatus 102 returns the access approval screen as a response (step S109). At this time, the user identification information and the device identification information are incorporated into the approval screen so that the user can recognize "what application attempts to access which resource". In the present embodiment, "the recording navigation application requests access to the recorded program list accumulated in the digital television" is displayed.

Subsequently, the user gives a response indicating whether or not the access to the device 104 by the application 110 is permitted, to the access approving apparatus 102 via an interface on a displayed Web page (step S110). If the response indicates consent, the access approving apparatus 102 issues the approval information (see FIG. 3) including content of the permission, and includes the approval information into the response (step S111). At this time, for re-transition from the access approval screen to the screen of the application 110, the callback URI passed in step S108 is designated as the redirection destination, in the Refer header. The above described approval information may be set as a query parameter of this callback URI. The access approving apparatus 102 stores the issued approval information to be associated with a set of the user identification information and the device identification information.

The Web browser is redirected to the screen of the application 110, according to this Refer header included in an access approval response (step S112).

In addition to the approval information set as a query of an accessed URI (the callback URI), the application 110 includes the user identification information and the device identification information into a token issuance request, and transmits the token issuance request to the access authorizing apparatus 101 (step S113).

When the access authorizing apparatus 101 receives the token issuance request, the token issuer 304 passes the approval information, the user identification information and the device identification information that have been received, to the token issuance determining unit 303. The token issuance determining unit 303 transmits the user identification information to the user authenticating apparatus 103 (step S114), and receives the user authentication result information (step S115), via the second transmitting/receiving unit 302. When the received user identification information has already been registered therein, the user authenticating apparatus 103 returns "authentication has succeeded", and otherwise, returns "authentication has failed". Moreover, the token issuance determining unit 303 transmits the approval information, the user identification information, and the device identification information to the access approving apparatus 102 (step S116), and receives the access enable/disable information (step S117), via the first transmitting/receiving unit 301. In the access approving apparatus 102, if there is the approval information stored to be associated with the set of the user identification information and the device identification information, and if its access enable/disable verification code is identical to that included in the received approval information, it is determined that the access is enabled. Otherwise, it is determined to be disabled. The token issuance determining unit 303 determines whether the token issuance is enabled or disabled, from the access enable/disable information and the user authentication result information that have been acquired. In a case of "enabled" and "success", it is determined that the token issuance is "enabled", and otherwise, it is determined to be "disabled", respectively. The token issuance determining unit 303 passes a result of the determination to the token issuer 304. Based on this determination result, if the token issuance is "enabled", the token issuer 304 generates the token information including the token (step S118), and stores the generated token information into the token information storage 305 (step S119). The token issuer 304 responds to the application 110, with the token or the token information that has been issued (step S120).

A flowchart of the above token issuing process in the access authorizing apparatus 101 (the token issuance determining unit 303 and the token issuer 304) is shown in FIG. 10.

Lastly, the application 110 accesses the resource (step S121), and displays a result of the resource access, to the user (step S122). Here, in S121, the application acquires the recorded program list accumulated in the digital television, and presents a result of the acquisition to the user.

Here, a process procedure of the resource access in step S121 will be described in detail based on a sequence diagram of FIG. 8.

First, the application 110 calls the recorded program list acquiring API (step S1210). In the present embodiment, since the application 110 is the Web application arranged on the local HTTP server within the device 104, this API may be realized as a plug-in bound to JavaScript that can be called from the Web page, or may be realized as a Web API arranged on the same local HTTP server. This may be an API of a native library in a binary format depending on a form of the application, and a format of the API is not questioned. At this time, the application passes the token (and the confidential information issued along with the token) as an argument of the API.

In response to the API call, the device 104 transmits a request to acquire the token information corresponding to the token passed as the argument, to the token information provider 306 on the access authorizing apparatus 101 (step S1211). At this time, along with the token, the confidential information issued along with the token, the device identification information, device model type information and the like may be transmitted together. It should be noted that communication between the device 104 and the token information provider 306 is desirably encrypted. For example, HTTPS communication using an SSL (Secure Socket Layer) or TLS (Transport Layer Security) protocol may be used, IPSec may be used, or as long as data (the token or the token information) to be transmitted and received does not directly flow on the network 201, proprietary cryptographic communication may be used.

When receiving the token, the token information provider 306 authenticates the device 104 (step S1212). This may be performed by using the information stored in the token information storage 305 to verify whether or not the token has been issued for the access to this device. Alternatively, this may be performed by verifying whether or not a model type of this device publishes the resource for which the token is issued. Alternatively, this may be performed by querying the access approving apparatus 102 whether or not the device has been registered as an access approval target device. The device authentication may be performed by using other information included in the token information, or may be performed by a combination of specific methods listed above.

Next, the token information provider 306 authenticates the passed token (step S1213). This may be performed by collation of the confidential information issued along with the token, or may be simply performed depending on whether or not there is corresponding valid token information when the corresponding token information is acquired from the token information storage 305. This verification of the token may be performed by using other information included in the token information, or may be performed by a combination of the specific methods listed above. The token information provider 306 acquires the corresponding token information from the token information storage 305 (steps S1214 and S1215), and provides the corresponding token information to the device 104 (step S1216). If there is no corresponding token, or if the device authentication (step S1212) and the token authentication (step S1213) have failed, an error response is provided or blank token information is returned to the device 104.

When receiving the token information, the device 104 uses the token passed from the application 110, and the token information acquired from the token information provider 306, to determine whether the access is enabled or disabled (step S1217). The above described token authentication in step S1213 may be performed here (that is, on the device side). For the token information request, if the error response is received or if the blank token information is received, it is determined that the access is "disabled". On the other hand, if the token information is included in the response, it is determined whether or not the API (the recorded program list acquiring API) called in step S1210 is included in an accessible resource range included in the token information. If the API is included, the determination of whether the access is enabled or disabled results in "enabled", and the resource in the device is acquired (step S1218), and is provided to the application side (step S1219). If a valid flag or the term of validity is included in the token information, a condition that the valid flag is "valid" and the term of validity has not elapsed is added as a condition of "enabled" in the determination of whether the access is enabled or disabled. As simpler determination, it may be determined that the access is enabled, when the valid token information is received.

Here, a process procedure for invalidating the token will be described using FIG. 9.

First, an invalidation authority holder for the token issues a token invalidation request to the token invalidating unit 307 (step S123). This invalidation authority holder is assumed, for example, to be the developer who has developed the application 110, the device manufacturer of the device 104, the user of the application 110 and the device 104, the user authenticating apparatus 103 or the like. It is conceivable that this invalidation request may be generated by the application developer in order to prevent computer virus infection due to a defect in the application, destruction of the resource in the device, and the like. It is conceivable that, if an unauthorized application has been discovered, this invalidation request may be generated by the device manufacturer or an ordinary user for the purpose of eliminating this application. It is conceivable that this invalidation request may be generated by the user authenticating apparatus 103 automatically notifying the access authorizing apparatus 101 that the user identification information issued to the application has expired. Moreover, this may be performed by the token issuance determining unit 303 requesting the token invalidating unit 307 to cause the token with this user identification information included in the token information to expire, if the above described response (step S115) to the user authentication request in step S114 of FIG. 7 indicates "authentication has failed".

When receiving the invalidation request, the token invalidating unit 307 requests the token information storage 305 to invalidate the corresponding token information (step S124).

The token information storage 305 invalidates the corresponding token based on the request, and responds with a processing result (step S125). The invalidation is performed, for example, by deleting the token information including this token, or setting the valid flag included in this token information to be "invalid". At this time, if the notification of the invalidation of the corresponding token as shown in subsequent steps S127 and later is executed, the invalidated token information is included into the response.

In this way, the token invalidating unit 307 realizes the invalidation of the token by transmitting the invalidation request to the token information storage 305 and receiving the response (S126). When invalidating the token, the token invalidating unit 307 requests the token information provider 306 to notify the invalidation of the token to the target device 104 of the corresponding token (step S127). At this time, information on the target device of the corresponding token is obtained from the token information included in the response in step S125.

In response to the invalidation notification request, the token information provider 306 notifies that the corresponding token has been invalidated (step S128). At this time, as described above, the communication channel has already been established between the device 104 and the token information provider 306, and this invalidation notification is realized by using an asynchronous communication technique such as the Comet or the WebSocket.

On the other hand, when receiving the invalidation notification from the token information provider 306, the device 104 invalidates the corresponding token information that has been previously received from the token information provider 306 and cached (step S129). The device 104 responds to the access authorizing apparatus side (the token information provider 306), indicating that the corresponding token has been invalidated on the device side (steps S130 and S131).

As described above, according to the present embodiment, according to the access authorizing apparatus, even in a case where a third party (the application 110 or its developer) cannot directly construct a trust relationship with a resource managing entity (the device 104, that is, the digital television, and the user who is the owner thereof), authority to access the resource can be transferred to the third party, and also, a manager of the resource managing entity other than the user (for example, the device manufacturer) can prevent unauthorized access to the resource by the third party.

Specifically, an enormous number of the digital televisions as the resource managing entities exist, and can be manufactured and sold even after the application has been sold and distributed. Thus, authorization for access to a particular digital television cannot be previously issued to the application 110. Even in such a case, firstly, the user performs an approving process without involving the application 110, in steps S108 to S111 of FIG. 7. Thereby, even if the ID or the password of the user is required in the access approving apparatus 102, the approving process can be performed without leaking it to the application. In other words, the authority can be transferred from the user to the application. Secondly, not only the user but also the authority holder including the device manufacturer invalidates the issued token, and furthermore, invalidation information is transmitted to the device side (steps S127 to S131 of FIG. 9) or acquired by the device side (steps S1211 to S1216 of FIG. 8). Thereby, unauthorized use of the resource by the application can be prevented.

<Variation of User Authentication>

The token issuing process sequence of the present embodiment is not limited to FIG. 7. Particularly, the user authentication may be performed before the approval is obtained from the user (the access approver).

Figure 15:
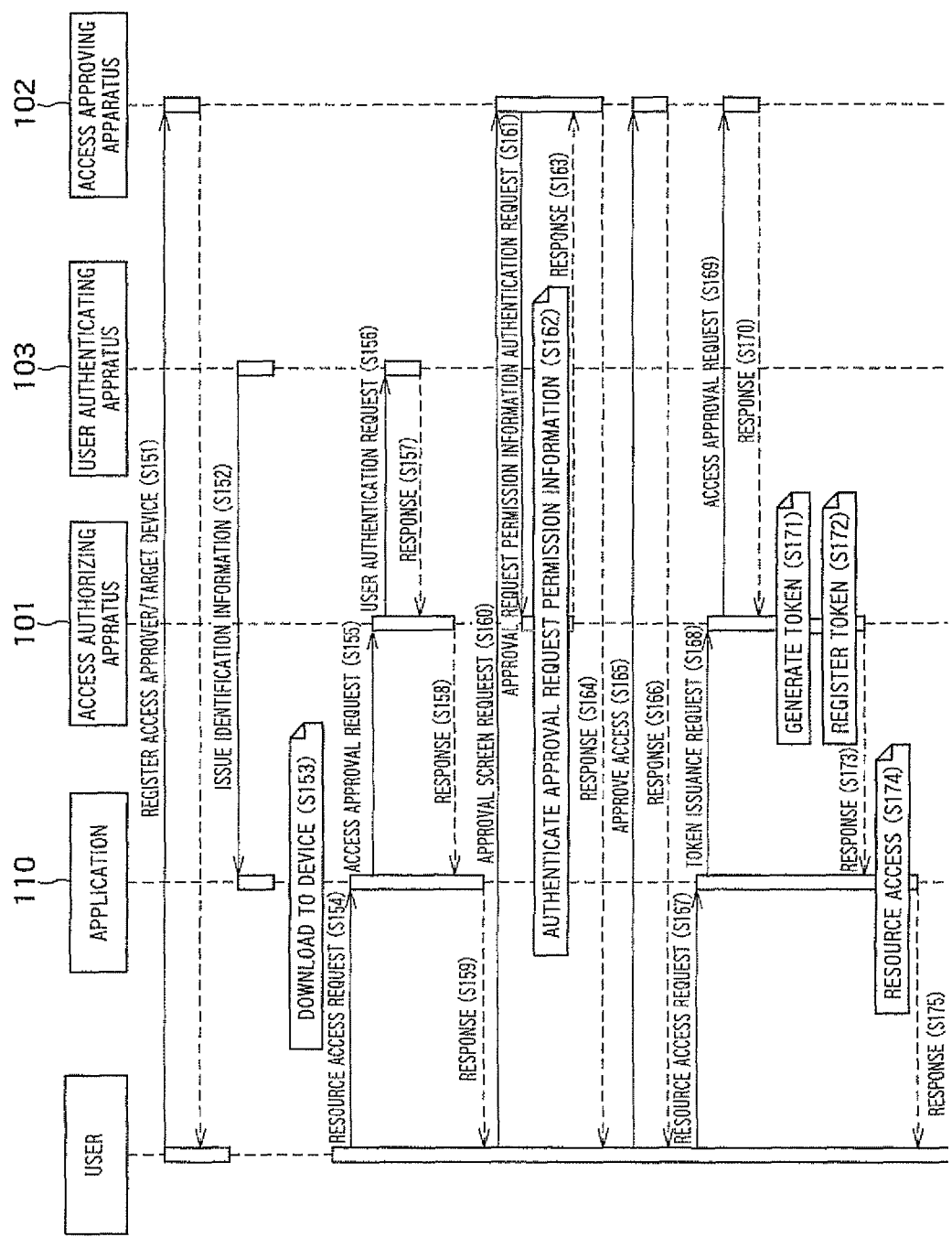
FIG. 15 is a communication sequence diagram (2) related to the token issuing process in the first embodiment of the present invention.

FIG. 15 shows a variation of the token issuing process sequence. In the sequence of this variation, the approval request permission information issuer 351, the approval request permission information storage 352, and the approval request permission information authenticating unit 353 are used.

In the sequence of this variation, the approval from the access approver can be first obtained through the user authentication. Specifically, at a time of the access approval request (steps S105 and S106) in FIG. 7, the user authentication is performed (steps S156 and S157 of FIG. 15). Here, if the user authentication has succeeded, the approval request permission information issuer 351 issues the approval request permission information to the application (user), and stores it in the approval request permission information storage 352. Here, the approval request permission information includes the approval request permission ID that can be uniquely identified in the approval request permission information storage 352, and can further include the confidential information for proving the validity of this ID. The approval request permission information is included in the responses to the application and the user (steps S158 and S159).

When the user requests the access approving apparatus 102 for the approval screen (step S160), the user passes this approval request permission information. The access approving apparatus 102 transmits the passed approval request permission information to the approval request permission information authenticating unit 353 on the access authorizing apparatus 101 (step S161). The approval request permission information authenticating unit 353 collates corresponding approval request permission information stored in the approval request permission information storage 352, with the received information, to perform the authentication (step S162), and returns a result of the authentication (step S163). For example, if the approval request permission information including the same ID as an ID included in the received information is stored in the approval request permission information storage 352, it is regarded as "authentication has succeeded", and otherwise, it is regarded as "authentication has failed". If the authentication has succeeded, the access approving apparatus 102 returns the approval screen to the user (step S164). Here, the user authentication (steps S114 and S115) in response to the token issuance request in FIG. 7 is not required in the sequence of FIG. 15.

<Variation of Token Issuing Process>

Moreover, the token issuing process sequence described in the present embodiment is not limited to FIG. 7. For example, at a time of the token issuance, if there is no need to perform the authentication of the user (the application), a user authenticating process (steps S114 and S115) may be omitted. Moreover, steps S105 and S106 can be omitted by previously presetting a destination of the access approval request on the access approving apparatus 102, into the application 110. Moreover, if the application 110 is a trusted application, the ID or the password of the user may be directly transmitted to the access approving apparatus 102 via the application, without redirection to an approval page of the access approving apparatus 102. In this case, it may be configured so that steps S107 and S112 are omitted and the processes in steps S108 to S111 are directly performed by the application 110.

<Variation of Resource Access Control>

Moreover, a resource access process sequence described in the present embodiment is not limited to FIG. 8. In FIG. 8, it is configured so that necessary token information is acquired from the token information provider 306 each time the resource access by the application occurs. However, separately from the resource access sequence, it may be configured so that the token information provider 306 is periodically accessed to acquire the entire token information for the particular device (the device 104), or to acquire the entire token information for the particular application (the application 110), or to acquire all the valid token information or all the invalid token information accumulated in the token information storage 305, and the acquired token is accumulated in the device and is used for the determination of the access. In this case, processes in steps S1211 to S1216 can be omitted. Moreover, as described in the invalidating process, if a unit that performs notification from the access authorizing apparatus 101 (the token information provider 306) to the device 104 can be used, processes in steps S1211 to S1216 can be similarly omitted by timely notifying a terminal side of the generated token information. When a resource access request is received in step S104 of FIG. 7, it is judged whether or not the corresponding valid token information exists, and when the corresponding valid token information exists, step S121 may be performed without performing steps S105 to S120.

<Variation of Network Configuration>

Figure 5:
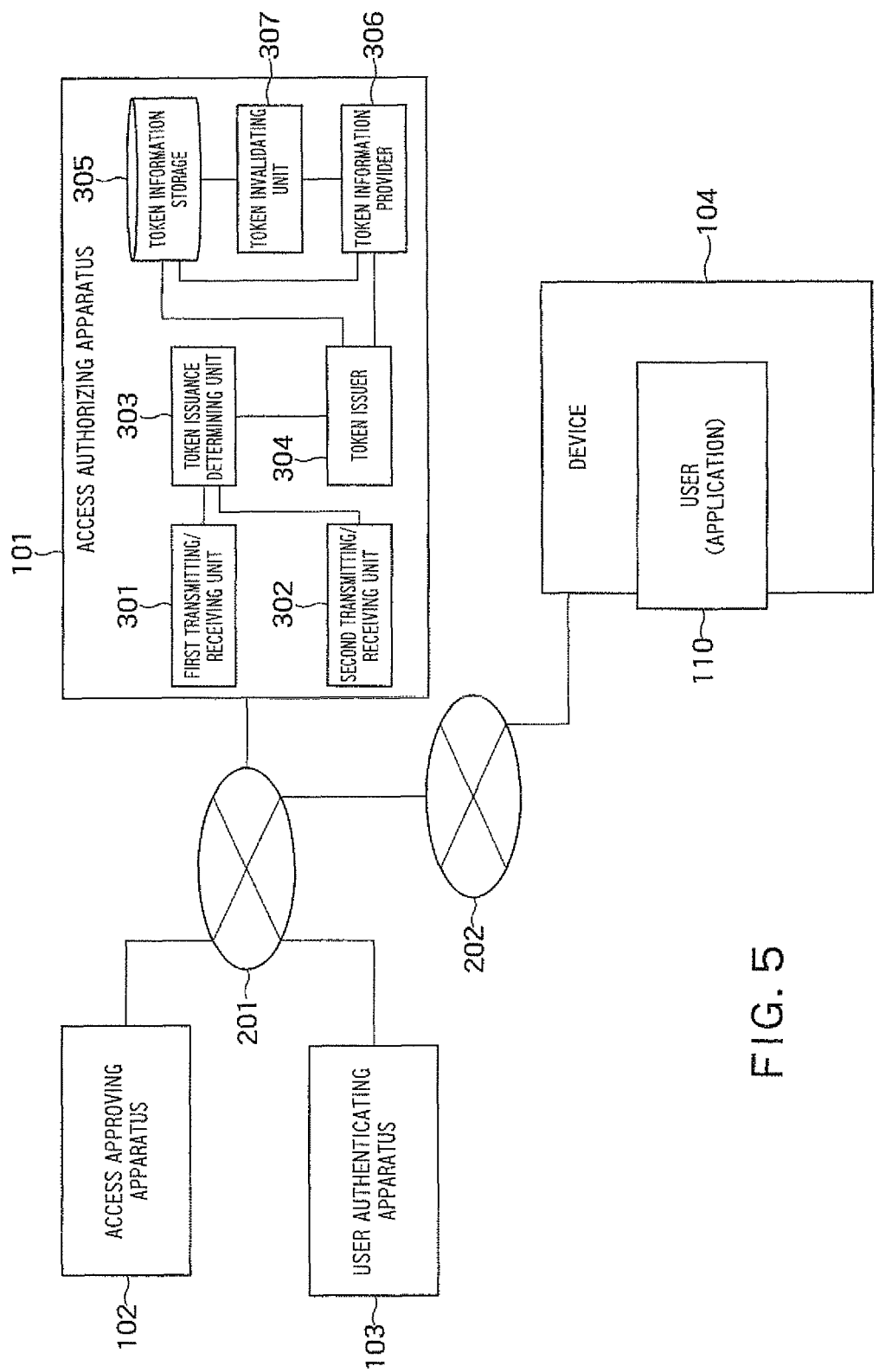
FIG. 5 is a diagram (1) showing a variation of a network configuration of the system according to the first embodiment of the present invention.
Figure 6:
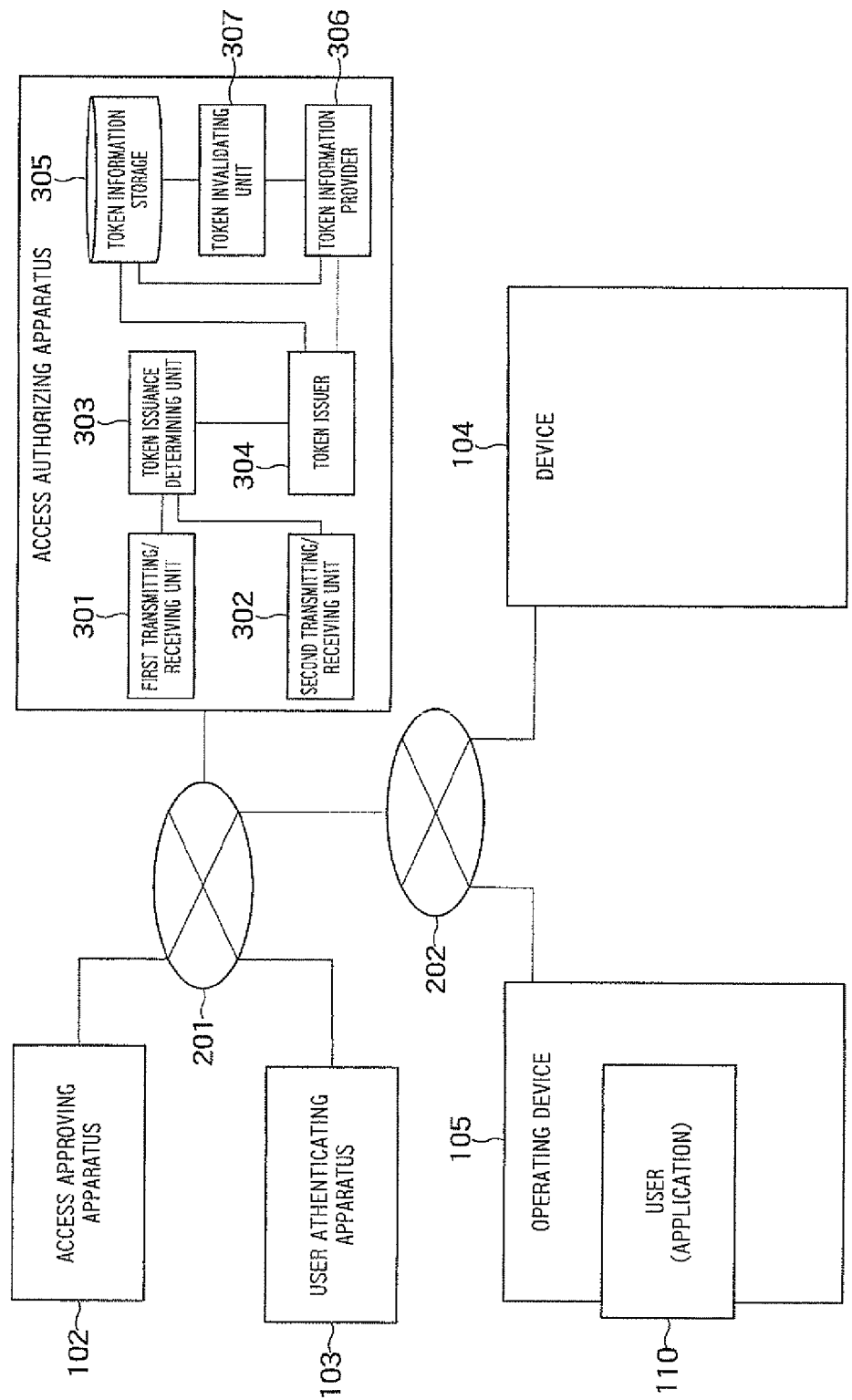
FIG. 6 is a diagram (2) showing a variation of the network configuration of the system according to the first embodiment of the present invention.

It should be noted that FIGS. 5 and 6 show variations of a network configuration in the system including the access authorizing apparatus described in the present embodiment. However, here, a case where the sequence of FIG. 15 is not performed is assumed, and the approval request permission information issuer 351, the approval request permission information storage 352, and the approval request permission information authenticating unit 353 are omitted from the access authorizing apparatus of FIG. 1. If the sequence of FIG. 15 is performed, these elements 351 to 353 may be provided in the access authorizing apparatus of FIG. 5 or 6.

In the above described embodiment, for simplicity, it is assumed that all system components are connected to the network 201 (the Internet). However, in the configurations of FIGS. 5 and 6, the device 104 is connected to a network 202. The network 202 is a home network configured with, for example, a wired or wireless LAN (Local Area Network). The network 201 and the network 202 are connected by a terminating device for a WAN (Wide Area Network), such as a broadband router. Communication between the device 104 and the access authorizing apparatus 101 is realized via this terminating device.

Moreover, in FIG. 6, the application is downloaded not onto the device 104 but onto another device (an operating device 105) on the network 202. In other words, while the device operated by the application is the device 104 in the configuration of FIG. 1 or 5, the device operated by the application is the device 105 in the configuration of FIG. 6. If the application 110 has any unit through which the access target device 104 is found and the device identification information (and the device information) thereof is known, the application 110 and the device 104 may exist on separate entities on the network. As the above described unit, for example, UPnP (Universal Plug And Play) and DLNA (Digital Living Network Alliance), which realize plug and play including finding a premise device, can be used. As long as a unit through which a peripheral device is found and its resource can be recognized is provided, the unit is not limited to these existing protocols, and another unit including a proprietary protocol may be used.

Second Embodiment

Next, a second embodiment of the access authorizing apparatus will be described. It should be noted that the second embodiment is common in many parts to the first embodiment, and thus will be described using the same reference numerals, or the description will be omitted.

Figure 2:
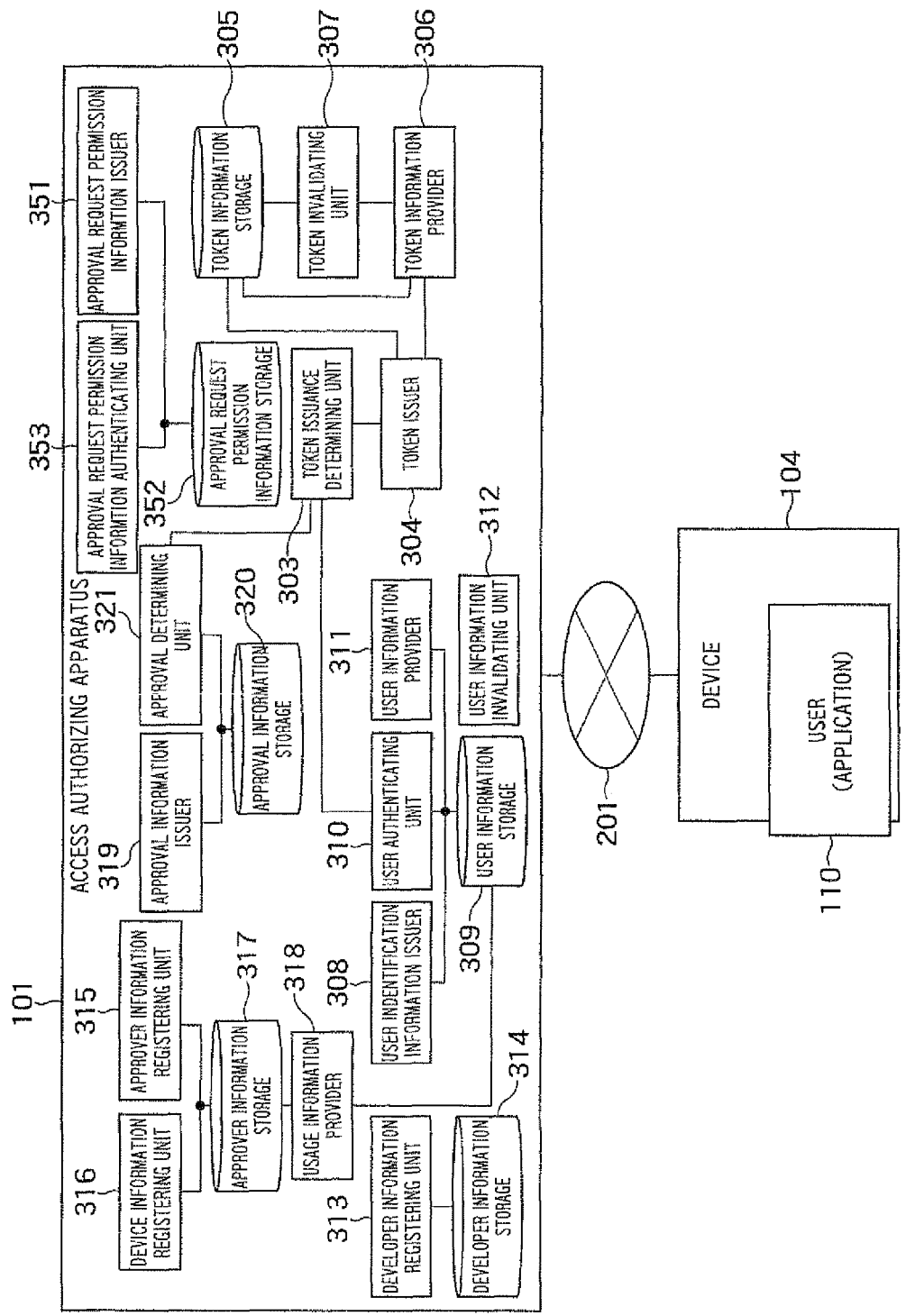
FIG. 2 is a block diagram showing the configuration of the system according to a second embodiment of the present invention.

FIG. 2 is a system configuration diagram including the functional blocks of the access authorizing apparatus 101 according to the second embodiment of the present invention. Respective internal processes in the functional blocks 303 to 307 included in the system, and interactions among the blocks in the access authorizing apparatus 101 FIG. 2 are also identical to the first embodiment.

A different point is that all functions included in the access approving apparatus 102 and the user authenticating apparatus 103 in the first embodiment are incorporated in the access authorizing apparatus 101. In other words, functional blocks 308 to 321 are newly added. Moreover, the first transmitting/receiving unit 301 and the second transmitting/receiving unit 302 for the communication with the access approving apparatus 102 and the user authenticating apparatus 103 are not included.

A hardware configuration assumed by the access authorizing apparatus 101 according to the present embodiment is a combination of the access authorizing apparatus 101, the access approving apparatus 102, and the user authenticating apparatus 103 in the first embodiment.

Next, the various functions realized by the CPU of the access authorizing apparatus 101 executing the various programs stored in the main storage and the auxiliary storage will be described according to FIG. 2. The access authorizing apparatus 101 has the token issuance determining unit 303, the token issuer 304, the token information storage 305, the token information provider 306, the token invalidating unit 307, a user identification information issuer 308, a user information storage 309, a user authenticating unit 310, a user information provider 311, a user information invalidating unit 312, a developer information registering unit 313, a developer information storage 314, an approver information registering unit 315, a device information registering unit 316, an approver information storage 317, a usage information provider 318, an approval information issuer 319, an approval information storage 320, an approval determining unit 321, the approval request permission information issuer 351, the approval request permission information storage 352, and the approval request permission information authenticating unit 353.

Subsequently, details of the respective units included in the present invention, which are different from the first embodiment, will be described below.

The user identification information issuer 308 issues the user identification information to the application (the user). Specifically, the user identification information issuer 308 is provided as a function on the HTTP server, and when the developer of the application registers the user information (for example, via a Web page for the registration), the user identification information is generated and issued. Simultaneously, the generated user identification information is stored along with the user information, into the user information storage 309. The user identification information has been issued before the application is published/distributed, and has been set in the application by the developer. The user identification information issuer 308 may request not only the user information but also the developer information, as information required for the issuance. It should be noted that the user identification information includes the user ID that can uniquely identify the user, and can further include the confidential information for authenticating the validity of the user ID.

The user information storage 309 stores the above described user identification information, and the user information associated with the user identification information (that is, application information). The user information also includes identification information, range information, class/attribute information and the like on the resource to be accessed.

The user authenticating unit 310 authenticates the user identification information that is inputted, based on the information stored in the user information storage 309, and returns the user authentication result information. For example, when the user ID, the hash value of the confidential information, and the information on the used hash function are passed to the user authenticating unit 310, the user authenticating unit 310 obtains a hash value of confidential information accumulated in the user information storage 309, based on the passed information on the hash function, and determines whether or not there is a match. Alternatively, instead of the hash values, a message and a signature attached by using this confidential information may be used to perform the authentication. Furthermore, based on the identification information, the range information, the class/attribute information and the like on the resource to be accessed, which are included in the user information, whether or not there are matches in various kinds of information on the resource that is inputted, may be used for the authentication.

The user information provider 311 returns the user information corresponding to the user identification information that is inputted. At this time, while the user authentication is desirably involved for a request from outside of the access authorizing apparatus 101, the user information may be returned in response to a request from within the apparatus, without performing the user authentication.

The user information invalidating unit 312 acquires the invalidation request for the issued user identification information, and deletes corresponding user identification information in the user information storage 309, or sets the above described logical value information representing "valid" or "invalid" that is included in the user information, to be "invalid". It should be noted that, similarly to the token invalidating unit 307, the invalidation request for the user information may be realized by the communication via the network 201, or may be realized offline. For example, when the user of the device calls the call center and reports the unauthorized application, it can also be regarded as the invalidation request. Alternatively, it may be the mail-based report. The invalidation of the user information may be realized by operating a database system that is an entity of the user information storage 309, by the operator of the access authorizing apparatus 101 in response to such an invalidation request. Furthermore, in order to notify the corresponding device of the invalidation of the user information simultaneously with occurrence thereof, the token invalidating unit 307 may be notified thereof. In this case, the token invalidating unit 307 regards notification from the user information invalidating unit 312, as the invalidation request for the token, and notifies the device thereof via the token information provider 306.

The developer information registering unit 313 registers information on the developer of the application as the developer information. Specifically, the developer information registering unit 313 is provided as a function on the HTTP server, and when the developer of the application registers the information thereon (for example, via a Web page for the registration), a developer ID is generated and issued. Simultaneously, the generated developer ID is stored along with the registered developer information, into the developer information storage 314. The developer information can be provided along with the user information by the user information provider 311.

The developer information storage 314 stores the developer information registered via the developer information registering unit 313, along with the generated developer ID. In response to a request from the user information provider 311, the developer information is outputted.

The approver information registering unit 315 registers information on the access approver that approves the access to the resource of the device, onto the access authorizing apparatus 101, based on a request from the access approver. Specifically, similarly to the user identification information issuer 308 and the developer information registering unit 313 as described above, the approver information registering unit 315 is provided as a function on the HTTP server, and when the owner of the device registers the approver information (for example, via a Web page for the registration), approver identification information is generated and issued. At this time, the generated approver identification information is stored along with the registered approver information, into the approver information storage 317. This approver identification information includes an approver ID that can uniquely identify the access approver, and can further include confidential information (such as a password) for authenticating validity of the approver ID. The approver identification information may be issued in a form in which the owner of the device confirms that an existing ID does not exist in the approver information storage 317, and then approves the approver ID and the password that have been inputted via the above described Web page for the registration.

The device information registering unit 316 registers the information on the owned device, onto the access authorizing apparatus 101, based on the request from the access approver. Similarly to the approver information registering unit 315, the device information registering unit 316 is provided as a function on the HTTP server. The access approver registers the device information (for example, via a Web page for the registration), and simultaneously, the device information is stored as the information on the device owned by the approver, into the approver information storage 317. At this time, a process for confirming whether or not the access approver owns this device may be performed. For example, it may be performed by displaying a one-time password, a two-dimensional barcode or the like on a screen of the device, and inputting it from the above described Web page for the registration. Alternatively, it may be performed by embedding the confidential information within the device or separately issuing the confidential information as a document similar to a warranty certificate or the like, in shipment of the device, and inputting this confidential information from the registration page.

The approver information storage 317 stores the above described approver information, and the device information on the device owned by the approver.

The usage information provider 318 acquires the user identification information and the device identification information from the access approver, and provides usage information to be presented when the approval is obtained from the access approver. The usage information can include the user information, the developer information, the device information, and information on the resource to which access is requested by the application. The usage information provider 318 acquires necessary information from the approver information storage 317 and the user information storage 309, depending on a configuration of the usage information to be presented, and provides the necessary information to the access approver.

The approval information issuer 319 acquires a result of the approval by the access approver based on the usage information provided by the usage information provider 318, and issues the approval information. The approval information includes at least the access enable/disable verification code indicating that the approval has been obtained, and can further include class information, attribute information or range information on the approved resource. This is different from the information related to the resource, which is included in the usage information. For example, the usage information includes three kinds of APIs (A), (B) and (C) as accessible resources. However, this approval information includes only the API (B) to which access has actually occurred. In other words, this approval information is a subset of the information related to the resource, which is included in the usage information. The approval information issuer 319 stores this approval information in the approval information storage 320.

The approval information storage 320 stores the approval information issued by the approval information issuer 319. The approval information is stored to be associated with the user identification information and the device identification information.

The approval determining unit 321 determines whether or not the access to the resource has been approved by the access approver, based on the user identification information, the device identification information and the approval information that are inputted, and content in the approval information storage 320.

In response to the authentication request for the approval request permission information from the usage information provider 318, the approval request permission information authenticating unit 353 performs the authentication based on the information stored in the approval request permission information storage 352, and returns the authentication information. For example, the approval request permission ID, the hash value of the confidential information, and the information on the used hash function are passed to the approval request permission information authenticating unit 353 from the usage information provider 318. The approval request permission information authenticating unit 353 obtains the hash value of the confidential information accumulated in the approval request permission information storage 352, based on the passed information on the hash function, and determines whether or not there is a match. When there is a match, the authentication is regarded to have succeeded, and when there is not a match, the authentication is regarded to have failed. It should be noted that, instead of the hash values, the message and the signature attached by using this confidential information may be used to perform the authentication.

Next, the operations of the access authorizing apparatus 101 according to the present embodiment will be described using FIGS. 3, 4, 11, 12, 13 and 14. FIG. 3 shows the approval information in the present embodiment. FIG. 4 shows the token information acquired for accessing the resource in the device 104 by the application 110, which is stored by the token information storage 305 in the present embodiment.

Figure 11:
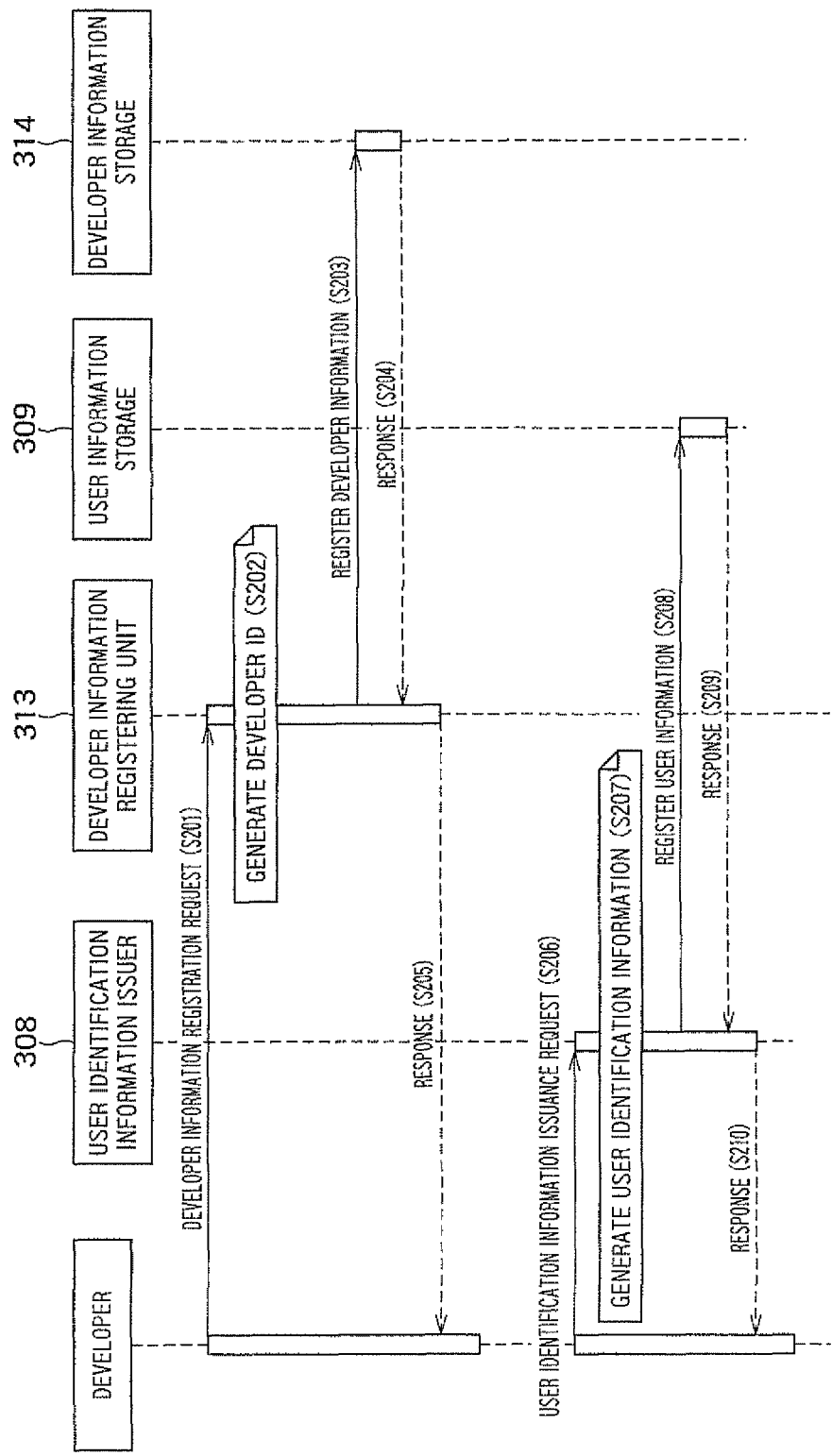
FIG. 11 is a communication sequence diagram related to developer/user registration in the second embodiment of the present invention.
Figure 12:
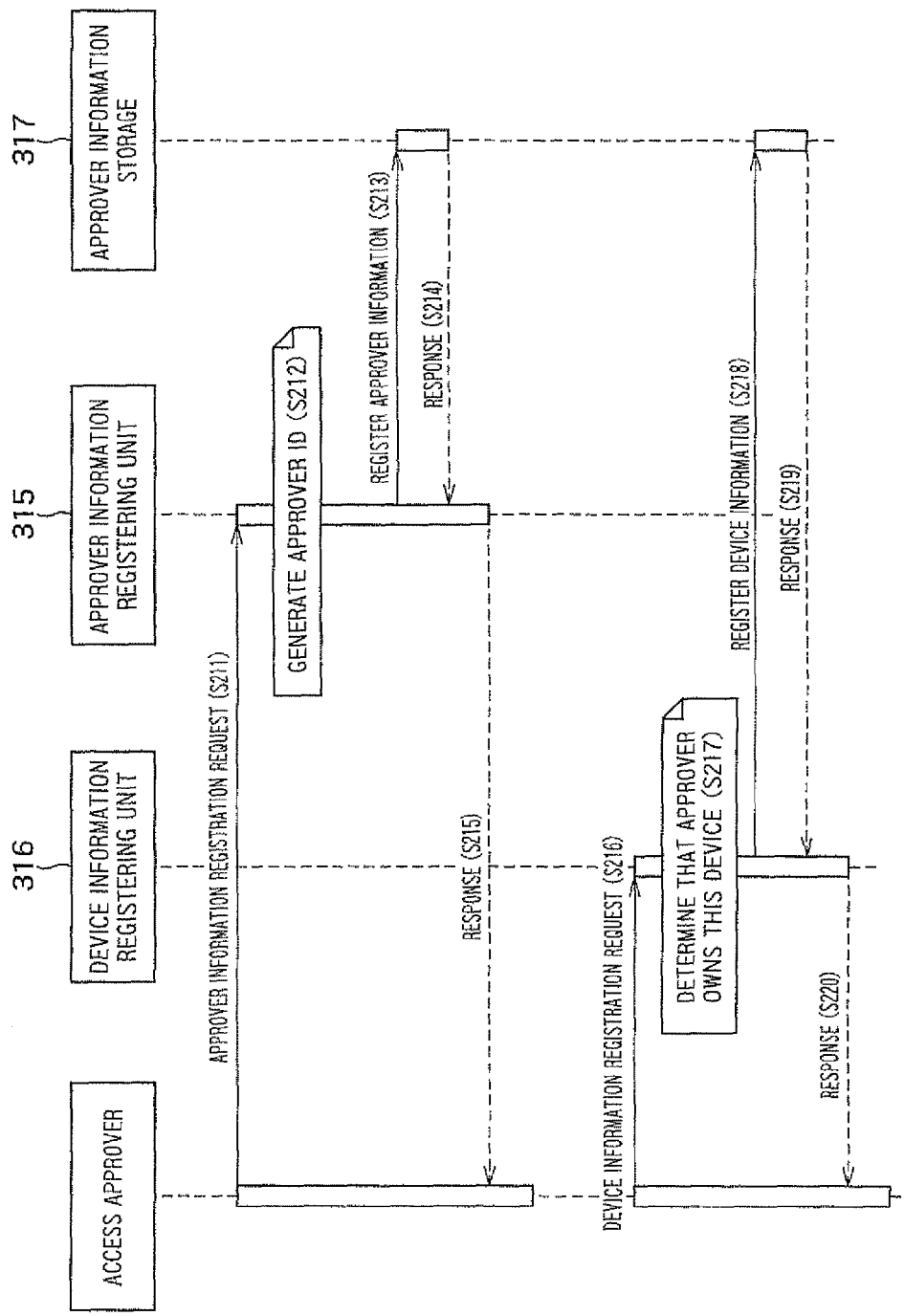
FIG. 12 is a communication sequence diagram related to approver/device registration in the second embodiment of the present invention.
Figure 13:
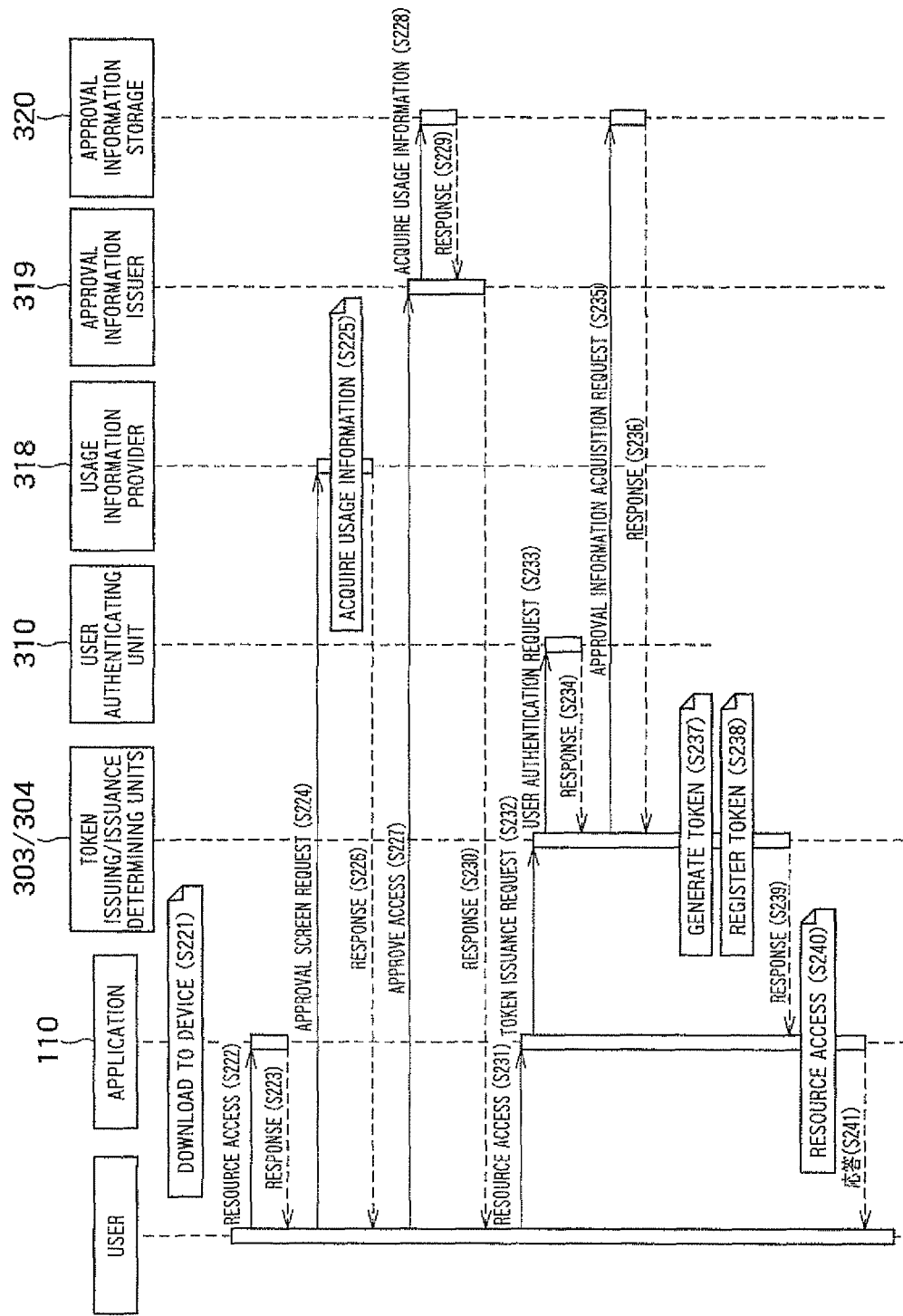
FIG. 13 is a communication sequence diagram related to token issuance in the second embodiment of the present invention.
Figure 14:
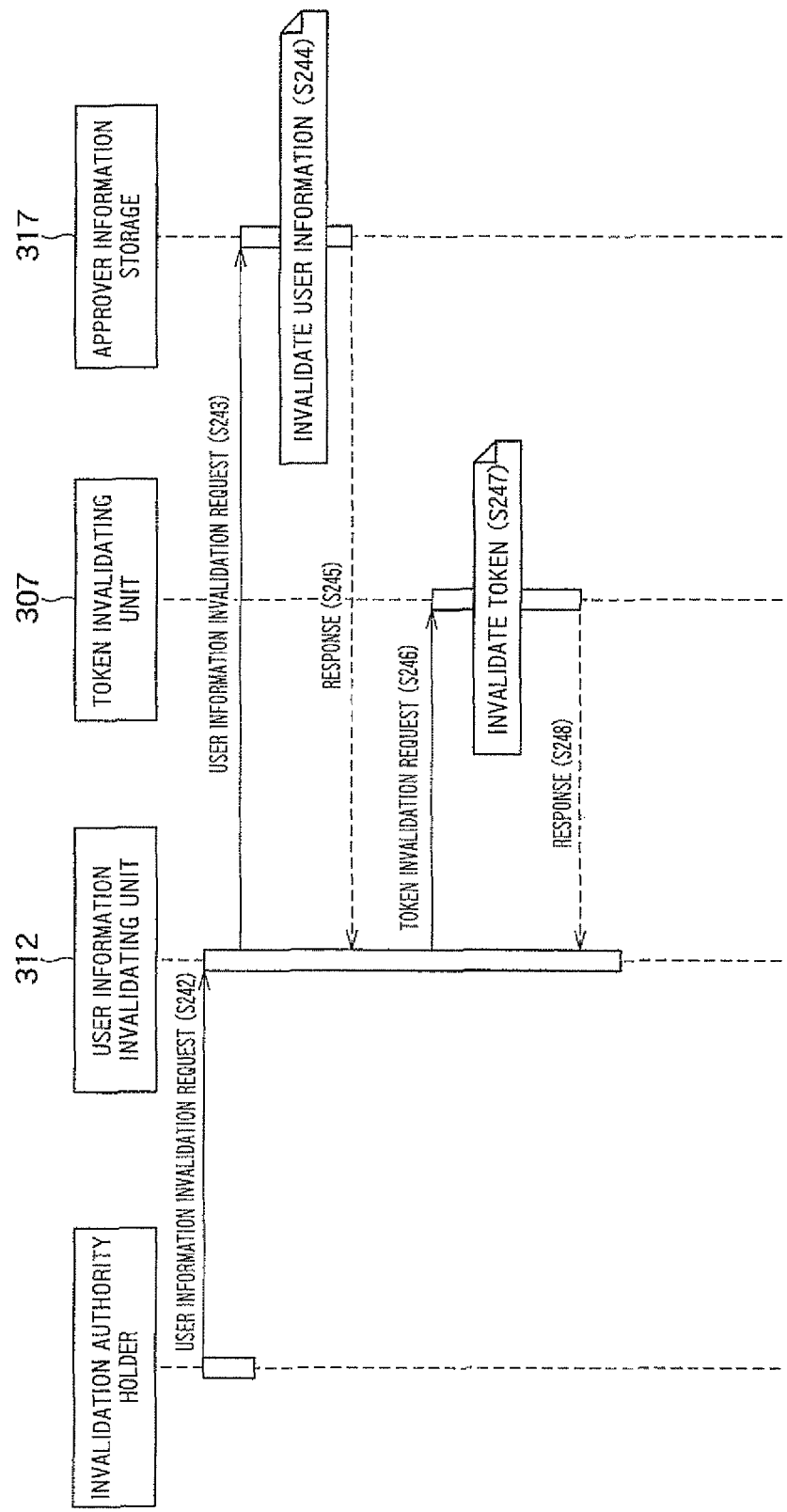
FIG. 14 is a communication sequence diagram related to user information invalidation in the second embodiment of the present invention.

FIG. 11 shows a process sequence for registering the user information according to the present embodiment. Moreover, FIG. 12 shows a process sequence for registering the approver information and the device information according to the present embodiment. FIG. 13 shows the token issuing process sequence according to the present embodiment. FIG. 14 shows a basic sequence of a license (token) invalidating process according to the present embodiment.

It should be noted that, similarly to the first embodiment, also in the present embodiment, the device 104 is the digital television, and the resource that is the access target is the recorded program information accumulated in the television. Moreover, the application 110 is the Web application for recording navigation that uses this recorded program information to browse and operate the recording list.

Hereinafter, first, a process procedure for issuing the user identification information will be described according to a sequence diagram of FIG. 11.

First, the developer of the application 110 requests the developer information registering unit 313 to register the developer information (step S201). The developer information registering unit 313 is, for example, a function that accepts registration information via a Web page and is arranged on a Web server. The developer registers various kinds of information such as the developer ID, the password, the developer name and the contact information, via this Web page. If the registered developer ID has not yet been registered on the developer information storage 314, the developer information registering unit 313 approves the registered developer ID as the developer ID (step S202), and stores the registered developer ID along with the registered developer information, into the developer information storage 314 (steps S203 and S204). After the registration, the developer information registering unit 313 responds to the developer, indicating that the registration has been completed, along with the registered developer ID (step S205). Here, if the developer ID for which registration has been applied for has already been registered, the developer is prompted to input the developer ID again, and this prompting is repeated until an unregistered developer ID is inputted. In addition to a method of requesting the developer to input an ID that becomes unique as described above, this developer ID registering process (step S202) may be configured so that the developer information registering unit 313 automatically generates a unique ID and notifies the developer side of the unique ID. It should be noted that the above sequence of processes (steps S201 to S205) may be omitted if the registration of the developer is not required.

Next, when developing the application 110, the developer requests the user identification information issuer 308 to issue the user identification information required for issuing the token (step S206). The user identification information issuer 308 is a function that accepts registration information via a Web page and is arranged on the Web server. The developer registers the application information such as the application name and the version, and the information on the resource desired to be accessed (the identification information, the class/attribute information, the range information and the like on the resource), as the user information via this Web page. When confirming that all necessary user information has been registered, the user identification information issuer 308 generates the user identification information (step S207), and registers the user information along with the generated user identification information, into the user information storage 309 (steps S208 and S209). After the registration, the user identification information issuer 308 responds to the developer, with the generated user identification information (step S210).

According to the above sequence, the user identification information with which the access authorizing apparatus 101 uniquely identifies and specifies the application is issued to the application.

Subsequently, a process procedure for registering the access approver, and the information on the device that is owned by the approver and becomes the access target, will be described according to a sequence diagram of FIG. 12.

First, the owner (the user) of the device 104 requests the approver information registering unit 315 to register the approver information (step S211). The approver information registering unit 315 is, for example, a function that accepts registration information via a Web page and is arranged on the Web server. The approver registers various kinds of information such as the approver ID, the password, an approver name and contact information, via this Web page. If the registered approver ID has not yet been registered on the approver information storage 317, the approver information registering unit 315 approves the registered approver ID as the approver ID (step S212), and stores the registered approver ID along with the registered approver information, into the approver information storage 317 (steps S213 and S214). After the registration, the approver information registering unit 315 responds to the approver, indicating that the registration has been completed, along with the registered approver ID (step S215). Similarly to the above described developer ID registering process, this approver ID registering process may be configured so that a unique ID is automatically generated and notified the approver side of the unique ID, instead of prompting the approver himself to input the ID.

Next, after purchasing the device 104, the approver requests the device information registering unit 316 to register the device (step S216). The device information registering unit 316 is a function that accepts registration information via a Web page and is arranged on the Web server. The approver registers the product name, the model number, a product number and the like of the device, as the device information via this Web page. In the registration, the device information registering unit 316 requests the approver to input the approver ID, the password and the like. Here, the device information registering unit 316 may perform some process for confirming that the approver owns the device (step S217). For example, binding between the approver and the device may be realized by presetting a URI of the access authorizing apparatus 101 into the device 104 so that, when the device 104 is connected to the network 201, this device information is automatically registered, and the PIN code, the two-dimensional barcode or the like is used to bind the device with the user (the access approver). Specifically, the device 104 establishes communication connection to the URI that has been preset in the device (or manually inputted by the user) and that indicates the device information registering unit 316 on the access authorizing apparatus 101. At this time, it may be configured so that a certificate that certifies validity of a client (the device) has been installed in the device, and this information is used to encrypt the communication. As a trigger for the establishment of the connection, the establishment may be performed by being connected to the network 201, or may be performed by the device 104 including an interface through which the user performs the registering process, and operating this interface. Here, when the user accesses a device information registration screen, the device information registering unit 316 generates, for example, a PIN code including a number of several digits, and transmits the PIN code to the device 104 by using the established communication connection. The device 104 displays this PIN code on the screen. The user inputs the displayed PIN code into a predetermined form (in which the PIN code is inputted) on the device information registration screen. If the issued PIN code and the PIN code inputted by the user coincide with each other, the device information registering unit 316 authenticates that the user (that is, the access approver) owns the device 104. This PIN code may be the two-dimensional barcode, and the PIN code to be transmitted to the device side may be character string image data. Moreover, on the contrary to the above described example, it may be configured so that the PIN code displayed on the device registration screen is inputted to the device 104, and the inputted PIN code is transmitted via the above described protected communication connection. As described above, various methods of realizing a method of binding the device and the user are conceivable, and the device information registering unit 316 may be realized by using these various kinds of known realizing means.

As described above, if it can be confirmed that the approver owns the device, the registered device information is stored to be associated with the approver ID, into the approver information storage 317 (steps S218 and S219). Lastly, the device information registering unit 316 responds to the approver, indicating the completion of the registration (step S220).

According to the above sequence, the device 104 and the access approver are associated with each other and registered in the access authorizing apparatus 101 (the approver information storage 317).

Subsequently, a token issuing process procedure will be described according to a sequence diagram of FIG. 13.

First, the application 110 is published/distributed and downloaded onto the device 104 (step S221). Here, the user performs the application operation involving the resource access (step S222). In the present embodiment, the application 110 is the recording navigation application, and the access to the resource (the recorded program list) can occur in the startup phase. When the resource access occurs (when the recorded program list acquiring API is called), the application 110 is redirected to a Web page corresponding to the usage information provider 318 (steps S223 and S224). This may be realized by previously setting a redirection URI in the application 110, or as described in the first embodiment, it may be configured so that the redirection is performed once the token issuer 304 is accessed. At this time, the redirection is realized by designating a URI of the approval screen of the usage information provider 318, in the Refer header in the HTTP GET response. Particularly, here, the user identification information, the device identification information and the callback URI are included as the query parameters into the URI of the redirection destination. The callback URI is included in order to display the screen of the application 110 again. The user authentication may be previously performed with the usage information provider 318 by using the approver ID and the password.

Subsequently, the usage information provider 318 receives the request, and uses the user identification information and the device identification information that are passed as arguments, to acquire the usage information (step S225). This provides a response after acquiring the necessary information from the approver information storage 317 and the user information storage 309, and configuring the necessary information as the access approval screen as described above, which, however, is omitted from FIG. 13 (step S226). At this time, the user identification information and the device identification information are incorporated in the access approval screen, and similarly to the first embodiment, "the recording navigation application requests access to the recorded program list accumulated in the digital television" is displayed.

Subsequently, the user gives a response indicating whether or not the access to the device 104 by the application 110 is permitted, to the approval information issuer 319 via the interface on the displayed Web page (step S227). If the response indicates consent, the approval information issuer 319 stores the approval information including content of the permission, into the approval information storage 320 (steps S228 and S229), and includes the approval information into the response (step S230). At this time, for the re-transition from the access approval screen to the screen of the application 110, the callback URI passed in step S223 is designated as the redirection destination, in the Refer header. The above described approval information may be set as the query parameter of this callback URI.

The Web browser on the device 104 is redirected to the screen of the application 110, according to this Refer header included in the access approval response (step S231). Subsequently, in addition to the approval information set as the query of the accessed URI (the callback URI), the application 110 includes the user identification information and the device identification information into the token issuance request, and transmits the token issuance request to the access authorizing apparatus 101, and the token issuer 304 acquires the token issuance request (step S232).

The token issuer 304 that has acquired the token issuance request passes the approval information, the user identification information, and the device identification information that have been received from the device 104, to the token issuance determining unit 303. The token issuance determining unit 303 passes the user identification information to the user authenticating unit 310 (step S233), and acquires the user authentication result information (step S234). Furthermore, the token issuance determining unit 303 acquires the approval information associated with the user identification information and the device identification information, from the approval information storage 320, and performs collation with the approval information passed as the argument to determine whether the access is enabled or disabled (steps S235 and S236). The token issuance determining unit 303 determines whether the token issuance is enabled or disabled, from the acquired user authentication result information and a result of the determination of whether the access is enabled or disabled, and passes the result of the determination to the token issuer 304. Based on this determination result, if the token issuance is "enabled", the token issuer 304 generates the token information including the token (see FIG. 3) (step S237), stores the generated token information into the token information storage 305 (step S238), and responds to the application 110, with the token information (step S239).

Lastly, the application 110 accesses the resource (step S240), and displays the result of the resource access, to the user (step S241). Here, the application 110 acquires the recorded program list accumulated in the digital television, and presents the result of the acquisition to the user. It should be noted that a process procedure of the resource access in step S240 is similar to the first embodiment and according to FIG. 8.

Lastly, the process procedure for invalidating the token will be described using FIG. 14.

First, an invalidation authority holder for the user information issues the user information invalidation request to the user information invalidating unit 312 (step S242). This invalidation authority holder is similar to the token invalidation authority holder, and is assumed, for example, to be the developer of the application 110, the device manufacturer of the device 104, the user of the application 110 and the device 104, or the like. The generation of this invalidation request is also similar to the generation of the token invalidation request as described in the first embodiment. It is possible to show a representative use case where if an unauthorized application has been discovered, this invalidation request is generated by the device manufacturer or an ordinary user for the purpose of eliminating this application.

When receiving the invalidation request, the user information invalidating unit 312 requests the user information storage 309 to invalidate the corresponding user information (step S243).

The user information storage 309 executes the invalidation of the corresponding user information (such as the deletion, or update of the valid flag) based on the request (step S244), and responds with a processing result (step S245). At this time, if the invalidation of the issued token as shown in subsequent steps S246 and later is executed, the invalidated user identification information is included into the response.

Subsequently, in response to the invalidation of the user information, the user information invalidating unit 312 requests the token invalidating unit 307 to invalidate the token issued to a corresponding user (step S246). Subsequent processes are similar to the token invalidation sequence in the first embodiment (steps S247 and S248), and the device 104 may be notified of the invalidation.

As described above, according to the present embodiment, even in the case where the third party (the application 110 or its developer) cannot directly construct the trust relationship with the resource managing entity (the device 104, that is, the digital television, and the user who is the owner thereof), the authority to access the resource can be transferred to the third party, and also, the manager of the resource managing entity other than the user (for example, the device manufacturer) can prevent the unauthorized access to the resource by the third party, according to the access authorizing apparatus alone, without using the external apparatuses such as the access approving apparatus and the user authenticating apparatus on the Internet, as in the first embodiment.

Moreover, as the difference from the first embodiment, the tokens related to the user (the application) can be collectively invalidated and the unauthorized use of the resource can be efficiently prevented, by invalidating the user identification information by the authority holder such as the user or the device manufacturer.

<Variation of User Authentication>

Lastly, similarly to the first embodiment, the user authentication may be performed before the approval is obtained from the user (the access approver). In this case, the user authentication in steps S233 and S234 is performed at a time point in step S225 in the token issuing process sequence of FIG. 13. For this purpose, similarly to the first embodiment, the approval request permission information issuer 351, the storage 352 and the authenticating unit 353 are required. The approval request permission information that proves that the user authentication has already been performed is passed to the usage information provider 318, and checked before the access approval.

The invention claimed is:

1. An access authorizing apparatus that is connected to a device having a resource used by a first application, and an access approving apparatus, respectively, via a network, the access authorizing apparatus comprising:
   a receiving unit configured to receive a token issuance request including first approval information indicating that access to the resource in the device has been approved by a user of the device, from the first application via the network;

a first transmitting/receiving unit configured to transmit an access approval request including the first approval information to the access approving apparatus, and receive access enable/disable information indicating whether the access to the resource by the first application is permitted, from the access approving apparatus, wherein the access approving apparatus is configured to previously store approval information for one or more applications that have been approved by the user to access the resource and, upon receiving approval information from an access-seeking application via the access authorizing apparatus, permitting the access-seeking application to access the resource if the access approving apparatus previously holds approval information associated with the access-seeking application and the received approval information corresponds to the previously stored approval information associated with the access-seeking application;

a token issuer configured to, when the access enable/disable information received by the first transmitting/receiving unit indicates that the access to the resource is permitted, issue token information that gives authority to access the resource to the first application; and a transmitting unit configured to transmit the token information issued by the token issuer, to the first application, wherein the access authorizing apparatus receives an access approval request which requests approval to access the resource of the device from the first application which has received a resource access request from the device, the access approval request including an URI of the access approving apparatus, and transmits a response including the URI of the access approving apparatus to the device via the first application, the access approving apparatus receives an approval screen request from the device redirecting to a redirection destination based on the URI, returns an access approval screen to the device, receives a user indication of access approval to the access approving apparatus from the device which has received the access approval screen, and transmits a response including the first approval information and an URI of the first application to the device, and the first application is configured to transmit the token issuance request including the first approval information to the access authorizing apparatus when receiving a resource access request including the first approval information from the device redirecting to another redirection destination based on the URI of the first application.

2. The apparatus according to claim 1, further comprising:
a token information storage configured to store the token information issued by the token issuer.

3. The apparatus according to claim 2, further comprising:
a token information provider configured to provide the token information issued by the token issuer or the token information in the token information storage, to the device.

4. The apparatus according to claim 3, further comprising:
a token invalidating unit configured to, in response to an invalidation request for the token information, from an external apparatus on the network or an operator of the apparatus, invalidate the token information in the token information storage.

5. The apparatus according to claim 3, further comprising:
a token invalidating unit,
wherein the token issuer sets a term of validity for the token information to be issued, and the token invalidating unit invalidates the token information whose term of validity has expired in the token information storage.

6. The apparatus according to claim 4, wherein
when the token information has been invalidated by the token invalidating unit, the token information provider notifies the device that the token information has been invalidated.

7. The apparatus according to claim 1, wherein
the token information includes a token representing an identifier of the token information.

8. The apparatus according to claim 7, wherein
the token information further includes at least one of device identification information that identifies the device, user identification information that identifies the first application, the first approval information, user information that is detailed information on the first application, device information that is detailed information on the device, information on a term of validity of the token information, and logical value information representing whether or not the token information is valid.

9. The apparatus according to claim 1, further comprising:
a second transmitting/receiving unit configured to transmit a user authentication request including user identification information that identifies the first application, to a user authenticating apparatus via the network, and receive user authentication result information indicating whether or not authentication of the first application has succeeded, from the user authenticating apparatus,
wherein when the user authentication result information indicating the success of the authentication of the first application is received by the second transmitting/receiving unit, the token issuer issues the token information.

10. The apparatus according to claim 1, further comprising:
a second transmitting/receiving unit configured to transmit a user authentication request including user identification information that identifies the first application, to a user authenticating apparatus via the network, and receive user authentication result information indicating whether or not authentication of the first application has succeeded, from the user authenticating apparatus;
an approval request permission information issuer configured to issue approval request permission information to the first application when the user authentication result information indicates the success of the authentication;
an approval request permission information storage configured to store the approval request permission information issued to the first application; and
an approval request permission information authenticating unit configured to receive an authentication request including the user identification information and the approval request permission information, from the access approving apparatus, and when the approval request permission information for the application in the user identification information included in the authentication request has been registered in the approval request permission information storage, return a response indicating the success of the authentication of the application, to the access approving apparatus.

11. The apparatus according to claim 1, wherein
the first approval information includes an access enable/disable verification code that identifies the approval by the access approver.

12. The apparatus according to claim 11, wherein
the first approval information further includes at least one of class information, attribute information and range information on the resource to which access has been approved.

13. The apparatus according to claim 8, wherein
the user identification information includes at least one of confidential information that proves validity of the user identification information, a hash value of the confidential information, and signature information using the confidential information.

14. An access authorizing apparatus that is connected to a device having a resource used by a first application, via a network, the apparatus comprising:
an approval information storage configured to store approval information for an application that has been approved by a user of the device to access the resource in the device;
a receiving unit configured to receive a token issuance request including first approval information from the first application via the network;
an approval determining unit configured to determine whether the first application is permitted to access the resource in the device, based on whether there is approval information conforming to the first approval information in the approval information storage;
a token issuer configured to, when the access to the resource is permitted by the approval determining unit, issue token information that gives authority to access the resource, to the first application;
a transmitting unit configured to transmit the token information to the first application via the network;
a usage information provider; and
an approval information issuer,
wherein the first application is configured to receive a resource access request from the device of the user and return a response including an URI of the usage information provider to the device,
the usage information provider receives an approval screen request from the device redirecting to a redirection destination based on the URI and returns an access approval screen to the device,
the approval information issuer receives an indication of access approval to the access approval screen based on a user's instruction, registers the first approval information in the approval information storage and transmits a response including the first approval information and an URI of the first application to the device,
the approval determining unit receives the token issuance request including the first approval information from the first application which has received a resource access request including the first approval information from the device redirecting to another redirection destination based on the URI of the first application.

15. The apparatus according to claim 14, further comprising:
a token information storage configured to store the token information issued by the token issuer.

16. The apparatus according to claim 15, further comprising:
a token information provider configured to provide the token information issued to the first application or the token information in the token information storage, to the device.

17. The apparatus according to claim 16, further comprising:
a token invalidating unit configured to, in response to an invalidation request for the token information, from an external apparatus on the network or an operator of the apparatus, invalidate the token information in the token information storage.

18. The apparatus according to claim 16, further comprising:
a token invalidating unit,
wherein the token issuer sets a term of validity for the token information to be issued, and
the token invalidating unit invalidates the token information whose term of validity has expired in the information storage.

19. The apparatus according to claim 17, wherein
when the token information has been invalidated by the token invalidating unit, the token information provider notifies the device that the token information has been invalidated.

20. The apparatus according to claim 14, wherein
the token information includes a token representing an identifier of the token information.

21. The apparatus according to claim 20, wherein
the token information further includes at least one of device identification information that identifies the device, user identification information that identifies the first application, the first approval information, user information that is detailed information on the first application, device information that is detailed information on the device, information on the term of validity of the token information, and logical value information representing whether or not the token information is valid.

22. The apparatus according to claim 14, further comprising:
an approval information issuer configured to receive approval by the access approver showing that the first application is permitted to access the resource in the device, from the device, issue the first approval information based on the approval, and transmit the issued first approval information to the device,
wherein the approval information storage stores the first approval information issued by the approval information issuer.

23. The apparatus according to claim 22, further comprising:
a usage information provider configured to transmit usage information to query the access approver whether or not the first application is permitted to access the resource in the device, to the device.

24. The apparatus according to claim 23, wherein
the usage information includes user information that is detailed information on the first application, developer information on the first application, device information that is detailed information on the device, and information on the resource to which access is requested by the first application.

25. The apparatus according to claim 22, further comprising:
a receiving unit configured to receive user identification information that identifies the first application, from the first application;
a user authenticating unit configured to perform authentication based on the user identification information on the first application;
an approval request permission information issuer configured to, when the authentication in the user authenticating unit has succeeded, issue approval request permission information to the first application, and transmit the issued approval request permission information to the device;

an approval request permission information storage configured to store the approval request permission information issued to the first application; and an approval determining unit configured to receive the user identification information and the approval request permission information from the device, and when the approval request permission information for the application in the user identification information has been registered in the approval request permission information storage, permit a usage information provider to provide the usage information, and when the registration has not been performed, not give the permission.

26. The apparatus according to claim 14, further comprising:

a user authenticating unit configured to perform authentication based on user identification information that identifies the first application, wherein the receiving unit receives the user identification information from the first application, and when the authentication of the first application by the user authenticating unit has succeeded, the token issuer issues the token information.

27. The apparatus according to claim 14, wherein the first approval information includes an access enable/disable verification code that identifies the approval by the access approver.

28. The apparatus according to claim 27, wherein the first approval information further includes at least one of class information, attribute information and range information on the resource to which access has been approved.

29. The apparatus according to claim 21, wherein the user identification information includes at least one of confidential information that proves validity of the user identification information, a hash value of the confidential information, and signature information using the confidential information.

30. The apparatus according to claim 25, wherein the approval request permission information includes at least an approval request permission identifier that identifies the approval for the first application.

31. The apparatus according to claim 21, further comprising:

a user identification information issuer configured to receive the user information that is the detailed information on the first application, from the external apparatus on the network, and issue the user identification information on the first application.

32. The apparatus according to claim 31, further comprising:

a user information storage configured to store the user identification information and the user information to be associated with each other.

33. The apparatus according to claim 32, further comprising:

a user information provider configured to retrieve and provide the user information from the user information storage, in response to a request to provide the user information.

34. The apparatus according to claim 31, further comprising:

a user information invalidating unit configured to, in response to an invalidation request for the user identification information, from the external apparatus on the network or the operator of the apparatus, invalidate the user identification information in a user information storage.

35. The apparatus according to claim 14, further comprising:

a developer information storage configured to store developer information related to a developer of an application; and a developer information registering unit configured to receive the developer information on the first application from an external apparatus on the network, and register the developer information on the first application into the developer information storage.

36. The apparatus according to claim 14, further comprising:

an approver information storage configured to store approver information on the access approver; and an approver information registering unit configured to receive the approver information on the access approver from an external apparatus on the network, and register the approver information on the access approver into the approver information storage.

37. The apparatus according to claim 36, further comprising:

a device information registering unit configured to receive device information on the device for which the access approver has authority to perform the access approval, from the external apparatus on the network, and register the device information into the approver information storage.

* * * * *